(12) United States Patent
Si et al.

(10) Patent No.: US 11,146,669 B2
(45) Date of Patent: Oct. 12, 2021

(54) DATA TRANSMISSION METHOD IN FLEXIBLE ETHERNET AND DEVICE

(71) Applicant: Huawei Technologies Co., Ltd., Shenzhen (CN)

(72) Inventors: Penghao Si, Shenzhen (CN); Xinyuan Wang, Beijing (CN); Jingfeng Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/392,178

(22) Filed: Apr. 23, 2019

(65) Prior Publication Data
US 2019/0281145 A1 Sep. 12, 2019

Related U.S. Application Data

(63) Continuation of application No. PCT/CN2016/103104, filed on Oct. 24, 2016.

(51) Int. Cl.
*H04L 29/08* (2006.01)
*H04L 29/06* (2006.01)
*H04L 12/40* (2006.01)

(52) U.S. Cl.
CPC ............ *H04L 69/324* (2013.01); *H04L 29/06* (2013.01); *H04L 29/08* (2013.01); *H04L 69/02* (2013.01); *H04L 12/40* (2013.01)

(58) Field of Classification Search
CPC ....... H04L 69/324; H04L 29/06; H04L 29/08; H04L 69/02
See application file for complete search history.

(56) References Cited

U.S. PATENT DOCUMENTS

| 2008/0159260 A1* | 7/2008 | Vobbilisetty ............ H04L 69/08 370/351 |
| 2016/0028586 A1 | 1/2016 | Blair |

(Continued)

FOREIGN PATENT DOCUMENTS

| CN | 105122763 A | 12/2015 |
| EP | 3013017 A1 | 4/2016 |

(Continued)

OTHER PUBLICATIONS

"IEEE Standard for Ethernet," IEEE Computer Society, IEEE Std 802.3, Section 1, Sep. 3, 2015, 628 pages.

(Continued)

*Primary Examiner* — Deepa Belur
(74) *Attorney, Agent, or Firm* — Conley Rose, P.C.

(57) ABSTRACT

A data transmission method includes: obtaining multiple data blocks sent by L FlexE clients, L is greater than or equal to 1; and sending a data frame including the multiple data blocks to a physical-layer device, where a transmission rate of the data frame is N*100 Gbit/s, the data frame includes T data block groups, each of the T data block groups includes M continuous data block subgroups, each of the M continuous data block subgroups includes R*N continuous data blocks, the data frame further includes T overhead block groups, a $t^{th}$ overhead block group includes N continuous overhead blocks. According to the method, each data block subgroup in a data frame can include R*N data blocks, and each overhead block group can include N overhead blocks, and a data transmission rate can be adjusted flexibly.

20 Claims, 11 Drawing Sheets

(56) References Cited

U.S. PATENT DOCUMENTS

| | | | |
|---|---|---|---|
| 2016/0070615 A1* | 3/2016 | Zhong | G06F 11/10 |
| | | | 714/776 |
| 2016/0323164 A1 | 11/2016 | Cao | |
| 2017/0005901 A1* | 1/2017 | Gareau | H04L 43/0811 |
| 2017/0005949 A1* | 1/2017 | Gareau | H04L 12/413 |
| 2017/0171163 A1* | 6/2017 | Gareau | H04L 63/08 |
| 2017/0230338 A1* | 8/2017 | Loprieno | H04L 63/04 |
| 2018/0102834 A1* | 4/2018 | Ibach | H04B 10/0793 |
| 2020/0112383 A1* | 4/2020 | Liu | H04J 3/1658 |

FOREIGN PATENT DOCUMENTS

| | | | | |
|---|---|---|---|---|
| EP | 3306839 A1 * | 4/2018 | | H04J 3/1658 |
| WO | WO-2005039128 A1 * | 4/2005 | | H04L 29/06 |
| WO | WO-2017005108 A1 * | 1/2017 | | H04L 47/34 |
| WO | WO-2017156987 A1 * | 9/2017 | | |

OTHER PUBLICATIONS

"IEEE Standard for Ethernet," IEEE Computer Society, IEEE Std 802.3, Section 2, Sep. 3, 2015, 761 pages.
"IEEE Standard for Ethernet," IEEE Computer Society, IEEE Std 802.3, Section 3, Sep. 3, 2015, 346 pages.
"IEEE Standard for Ethernet," IEEE Computer Society, IEEE Std 802.3, Section 4, Sep. 3, 2015, 748 pages.
"IEEE Standard for Ethernet," IEEE Computer Society, IEEE Std 802.3, Section 5, Sep. 3, 2015, 835 pages.
"IEEE Standard for Ethernet," IEEE Computer Society, IEEE Std 802.3, Section 6, Sep. 3, 2015, 699 pages.
Wang, Q., Ed., "RSVP-TE Signaling Extensions in support of Flexible Ethernet networks," draft-wang-ccamp-flexe-signaling-02, Jul. 8, 2016, 13 pages.
Chiesa, L., et al, "FlexEthernet Tutorial," Optical Fiber Communication Conference, Mar. 20-22, 2016, 49 pages.
"Flex Ethernet Implementation Agreement," IA # OIF-FLEXE-01.0, Optical Internetworking Forum, Mar. 2016, 31 pages.
Foreign Communication From a Counterpart Application, PCT Application No. PCT/CN2016/103104, English Translation of International Search Report dated Jul. 27, 2017, 3 pages.
Foreign Communication From a Counterpart Application, PCT Application No. PCT/CN2016/103104, English Translation of Written Opinion dated Jul. 27, 2017, 5 pages.
Foreign Communication From a Counterpart Application, Chinese Application No. 201680090277.5, Chinese Office Action dated Feb. 3, 2020, 6 pages.
Foreign Communication From a Counterpart Application, Chinese Application No. 201680090277.5, Chinese Search Report dated Jan. 20, 2020, 2 pages.

* cited by examiner

DATA TRANSMISSION METHOD IN FLEXIBLE ETHERNET AND DEVICE

CROSS-REFERENCE TO RELATED APPLICATIONS

This application is a continuation application of Int'l Patent App. No. PCT/CN2016/103104 filed on Oct. 24, 2016, which is incorporated by reference.

TECHNICAL FIELD

Embodiments of the present application relate to the field of information technologies, and more specifically, to a data transmission method in flexible Ethernet and a device.

BACKGROUND

As the Internet Protocol (IP) is widely applied, network traffic increases significantly. Because an Ethernet interface standard and an Ethernet device are developed asynchronously, there is a gap between a bandwidth requirement of an Ethernet interface and an actual interface capability of the Ethernet device. In a known Ethernet interface standard, bandwidth of all Ethernet interfaces is fixed. Therefore, when the Ethernet device is interconnected with an optical interface device, bandwidth resources cannot be used effectively. In a data flow forwarding process, bandwidth of a data flow output by a medium access control (MAC) layer may not match bandwidth of one or more physical links at a physical layer.

An adaptation layer is defined between a MAC layer and a physical coding sublayer (PCS) in the Flexible Ethernet (FlexE) standard published by the Optical Internetworking Forum (OIF). The adaptation layer enables a transmission rate of an Ethernet interface to match multiple service scenarios. When a network processor (NP) or a forwarding device with higher bandwidth emerges, the NP or the forwarding device may achieve maximum performance without waiting for a standardization organization to define an Ethernet interface with higher bandwidth.

According to the existing FlexE standard published by the OIF, a transmission rate of a data flow transmitted (sent or received) by each physical layer (PHY) device is 100 gigabits per second (Gbit/s). In some approaches, a single PHY device in FlexE cannot transmit a data flow at a transmission rate that is higher than 100 Gbit/s.

SUMMARY

Embodiments of the present application provide a data transmission method in FlexE and a device, to increase a quantity of data blocks in each data block subgroup in a data frame to R*N and increase a quantity of overhead blocks included in each overhead block group to N, so that a data transmission rate can be adjusted flexibly.

According to a first aspect, an embodiment of the present application provides a data transmission method in FlexE, where the method is applied to a physical layer, and the method includes: obtaining multiple data blocks, where the multiple data blocks are sent by L FlexE clients, and L is a positive integer greater than or equal to 1; and sending a data frame including the multiple data blocks to a physical-layer device, where a transmission rate of the data frame is N*100 gigabits per second Gbit/s, the data frame includes T data block groups, each of the T data block groups includes M continuous data block subgroups, each of the M continuous data block subgroups includes R*N continuous data blocks, the data frame further includes T overhead block groups, a $t^{th}$ overhead block group in the T overhead block groups is sent before a $t^{th}$ data block group in the T data block groups, the $t^{th}$ overhead block group and the $t^{th}$ data block group are continuous in the data frame, the $t^{th}$ overhead block group includes N continuous overhead blocks, a FlexE overhead block multiframe to which an $n^{th}$ overhead block in the $t^{th}$ overhead block group belongs carries a FlexE client indication field, the FlexE client indication field carried in the FlexE overhead block multiframe to which the $n^{th}$ overhead block in the $t^{th}$ overhead block group belongs is used to indicate a FlexE client that sends an $r^{th}$ data block in R data blocks in each data block subgroup in the $t^{th}$ data block group or used to indicate that an $r^{th}$ data block in R data blocks in each data block subgroup in the $t^{th}$ data block group is vacant, the FlexE client that sends the $r^{th}$ data block in the R data blocks in each data block subgroup in the $t^{th}$ data block group is one of the L FlexE clients, the $r^{th}$ data block in the R data blocks in each data block subgroup in the $t^{th}$ data block group is indicated only by the FlexE client indication field carried in the FlexE overhead block multiframe to which the overhead block belongs, and a quantity of bits included in each data block in the data frame is equal to a quantity of bits included in each overhead block in the data frame, where R, M, T, and N are positive integers greater than or equal to 2, t=1, . . . , T, n=1, . . . , N, and r=1, . . . , R. According to the foregoing technical solution, a quantity of data blocks in each data block subgroup in a data frame can be increased from 20 specified in the Flexible Ethernet Implementation Agreement 1.0 to R*N, and a quantity of overhead blocks included in each overhead block group is increased from 1 specified in the Flexible Ethernet Implementation Agreement 1.0 to N, and therefore, a data transmission rate can be adjusted flexibly.

With reference to the first aspect, in a first possible implementation of the first aspect, the R data blocks in each data block subgroup in the $t^{th}$ data block group are an $[R*(n-1)+1]^{th}$ data block to an $(R*n)^{th}$ data block in each data block subgroup in the $t^{th}$ data block group. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to the first aspect, in a second possible implementation of the first aspect, the R data blocks in each data block subgroup in the $t^{th}$ data block group are $(N*s+n)^{th}$ data blocks in each data block subgroup in the $t^{th}$ data block group, where s=0, 1, . . . , R-1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to any one of the first aspect or the foregoing possible implementations of the first aspect, in a third possible implementation of the first aspect, when L is greater than or equal to 2, $G^{th}$ data blocks in any H continuous data block subgroups in the M continuous data block subgroups are respectively sent by H FlexE clients in the L FlexE clients, where H is a positive integer greater than or equal to 2, H is less than or equal to L and less than or equal to M, and G is a positive integer greater than or equal to 1 but less than or equal to R*N. In this way, a transmission rate of each timeslot is 5/H Gbit/s, and therefore, a transmission rate of a smaller granularity can be supported.

With reference to the third possible implementation of the first aspect, in a fourth possible implementation of the first aspect, the FlexE client indication field includes a first FlexE client indication subfield and a second FlexE client indication subfield; the FlexE overhead block multiframe to which the $n^{th}$ overhead block in the $t^{th}$ overhead block group belongs includes Q FlexE overhead block frames; each of R FlexE overhead block frames in the Q FlexE overhead block frames carries one such first FlexE client indication subfield, and a $g^{th}$ FlexE overhead block frame in the R FlexE overhead block frames carries one such second FlexE client indication subfield; a first FlexE client indication subfield carried in an $r'^{th}$ FlexE overhead block frame in the R FlexE overhead block frames is used to indicate a FlexE client that sends an $r'^{th}$ data block in the R data blocks in each data block subgroup in the $t^{th}$ data block group or used to indicate that an $r'^{th}$ data block in the R data blocks in each data block subgroup in the $t^{th}$ data block group is vacant; a first FlexE client indication subfield carried in the $g^{th}$ FlexE overhead block frame in the R FlexE overhead block frames is used to indicate one of the H FlexE clients that send the $G^{th}$ data blocks in the H continuous data block subgroups; and the second FlexE client indication subfield carried in the $g^{th}$ FlexE overhead block frame in the R FlexE overhead block frames is used to indicate a position of one of the H FlexE clients, in a sequence of the H FlexE clients that send the $G^{th}$ data blocks in the H continuous data block subgroups; where $r'=1, \ldots, R$, $r'$ is not equal to g, g is a positive integer greater than or equal to 1 but less than or equal to R, and Q is a positive integer greater than or equal to R. According to the foregoing technical solution, a physical-layer device receiving the data frame may determine, according to a second FlexE client indication subfield carried in a $g^{th}$ FlexE overhead block frame in the R FlexE overhead block frames in each of H data frames, the position of one of the H FlexE clients, in the sequence of the H FlexE clients that send the $G^{th}$ data blocks in the H continuous data block subgroups. In addition, according to the foregoing technical solution, a $G^{th}$ data block in a first data block subgroup in a first data block group in a first data frame in the H continuous data frames is sent by a first FlexE client in the H FlexE clients.

With reference to the fourth possible implementation of the first aspect, in a fifth possible implementation of the first aspect, the FlexE client indication field further includes a third FlexE client indication subfield, each of the Q FlexE overhead block frames carries one such third FlexE client indication subfield, and each of the Q FlexE overhead block frames includes P overhead blocks; and a third FlexE client indication subfield carried in a $q^{th}$ FlexE overhead block frame in the Q FlexE overhead block frames is used to indicate whether a FlexE client that sends a $G^{th}$ data block in a first data block subgroup in a first data block group in P data block groups is a first FlexE client in the H FlexE clients, a $p^{th}$ data block group in the P data block groups is sent after a $p^{th}$ FlexE overhead block in the $q^{th}$ FlexE overhead block frame, and the $p^{th}$ data block group in the P data block groups and an overhead block group including the $p^{th}$ FlexE overhead block in the $q^{th}$ FlexE overhead block frame are continuous in the data frame, where P is a positive integer greater than or equal to 1, $p=1, \ldots, P$, $q=1, \ldots, Q$, and the following relationship is satisfied: T=Q*P. Based on the foregoing technical solution, if a third FlexE client indication subfield carried in an overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group, (N*P*H−1) overhead blocks are included between a next overhead block and the overhead block. The next overhead block carries a third FlexE client indication subfield indicating that a $G^{th}$ data block in a data block group is sent by the first FlexE client in the H FlexE clients, where the data block group and an overhead block group including a first overhead block in a FlexE overhead block frame to which the next overhead block belongs are continuous, and the data block group is transmitted after the overhead block group. In other words, every N*P*H overhead blocks include an overhead block, and a third FlexE client indication subfield carried in the overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group. In this way, the physical-layer device receiving the data frame may conveniently determine a data block sent by the first FlexE client in the H FlexE clients.

With reference to any one of the first aspect, or the first possible implementation of the first aspect to the third possible implementation of the first aspect, in a sixth possible implementation of the first aspect, the FlexE client indication field included in the FlexE overhead block multiframe to which the $n^{th}$ overhead block in the $t^{th}$ overhead block group belongs includes W FlexE client indication subfields, N overhead blocks in the $t^{th}$ overhead block group respectively belong to N FlexE overhead block multiframes, each of the N FlexE overhead block multiframes includes Q FlexE overhead block frames, and the W FlexE client indication subfields are carried in W FlexE overhead block frames in the Q FlexE overhead block frames; and each of $W_1$ FlexE client indication subfields in the W FlexE client indication subfields is used to indicate a FlexE client that sends one of the R data blocks in each data block subgroup in the $t^{th}$ data block group or used to indicate that one of the R data blocks in each data block subgroup in the $t^{th}$ data block group is vacant, and each of $W_2$ FlexE client indication subfields in the W FlexE client indication subfields is used to indicate a FlexE client that sends multiple data blocks in the R data blocks in each data block subgroup in the $t^{th}$ data block group or used to indicate that multiple data blocks in the R data blocks in each data block subgroup in the $t^{th}$ data block group are vacant, where W is a positive integer greater than or equal to 1, W is less than or equal to Q, $W_1$ and $W_2$ are integers greater than or equal to 0, and $W=W_1+W_2$. An overhead block may indicate that multiple data blocks are sent by a FlexE client and indicate the FlexE client that sends the multiple data blocks. A granularity of the data blocks corresponding to the overhead block is a sum of granularities of the multiple data blocks.

With reference to any one of the first aspect, or the first possible implementation of the first aspect to the third possible implementation of the first aspect, in a seventh possible implementation of the first aspect, N overhead blocks in the $t^{th}$ overhead block group respectively belong to N FlexE overhead block multiframes, each of the N FlexE overhead block multiframes includes Q FlexE overhead block frames, each of the Q FlexE overhead block frames includes P overhead blocks, a quantity of data block groups between a $p^{th}$ overhead block and a $(p+1)^{th}$ overhead block in the P overhead blocks is K, and a quantity of overhead blocks between the $p^{th}$ overhead block and the $(p+1)^{th}$ overhead block in the P overhead blocks is N*K−1, where p=1, . . . , P−1; Q, P, and K are positive integers greater than or equal to 1; and the following relationship is satisfied: T=Q*P*K. In the foregoing technical solution, a quantity of FlexE overhead block multiframes carried in a data frame is extended to N*K.

Any one of the first aspect or the possible implementations of the first aspect may be performed by a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip or a network device including a chip. The chip may be implemented by using an application-specific integrated circuit (ASIC) or a field-programmable gate array (FPGA). The network device may be a router, a network switch, or a firewall. The network device may include an Ethernet interface. The Ethernet interface may include the chip.

According to a second aspect, an embodiment of the present application provides a data transmission method in flexible Ethernet FlexE, where the method is applied to a physical layer, and the method includes: receiving a data frame sent by a physical-layer device, where the data frame carries multiple data blocks sent by L FlexE clients, a transmission rate of the data frame is N*100 gigabits per second Gbit/s, the data frame includes T data block groups, each of the T data block groups includes M continuous data block subgroups, each of the M data block subgroups includes R*N continuous data blocks, the data frame further includes T overhead block groups, a $t^{th}$ overhead block group in the T overhead block groups is received before a $t^{th}$ data block group in the T data block groups, the $t^{th}$ overhead block group and the $t^{th}$ data block group are continuous in the data frame, the $t^{th}$ overhead block group includes N continuous overhead blocks, a FlexE overhead block multiframe to which an $n^{th}$ overhead block in the $t^{th}$ overhead block group belongs carries a FlexE client indication field, the FlexE client indication field carried in the FlexE overhead block multiframe to which the $n^{th}$ overhead block in the $t^{th}$ overhead block group belongs is used to indicate a FlexE client that sends an $r^{th}$ data block in R data blocks in each data block subgroup in the $t^{th}$ data block group or used to indicate that an $r^{th}$ data block in R data blocks in each data block subgroup in the $t^{th}$ data block group is vacant, the FlexE client that sends the $r^{th}$ data block in the R data blocks in each data block subgroup in the $t^{th}$ data block group is one of the L FlexE clients, the $r^{th}$ data block in the R data blocks in each data block subgroup in the $t^{th}$ data block group is indicated only by the FlexE client indication field carried in the FlexE overhead block multiframe to which the overhead block belongs, and a quantity of bits included in each data block in the data frame is equal to a quantity of bits included in each overhead block in the data frame, where L is a positive integer greater than or equal to 1, R, M, T, and N are positive integers greater than or equal to 2, t=1, . . . , T, n=1, . . . , N, and r=1, . . . , R; and determining, according to the T overhead block groups, a FlexE client that sends each of the multiple data blocks. According to the foregoing technical solution, a quantity of data blocks in each data block subgroup in a data frame can be increased from 20 specified in the Flexible Ethernet Implementation Agreement 1.0 to R*N, and a quantity of overhead blocks included in each overhead block group is increased from 1 specified in the Flexible Ethernet Implementation Agreement 1.0 to N, and therefore, a data transmission rate can be adjusted flexibly.

With reference to the second aspect, in a first possible implementation of the second aspect, the R data blocks in each data block subgroup in the $t^{th}$ data block group are an $[12*(n−1)+1]^{th}$ data block to an $(R*n)^{th}$ data block in each data block subgroup in the $t^{th}$ data block group. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to the second aspect, in a second possible implementation of the second aspect, the R data blocks in each data block subgroup in the $t^{th}$ data block group are $(N*s+n)^{th}$ data blocks in each data block subgroup in the $t^{th}$ data block group, where s=0, 1, . . . , R−1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to any one of the second aspect or the foregoing possible implementations of the second aspect, in a third possible implementation of the second aspect, when L is greater than or equal to 2, $G^{th}$ data blocks in any H continuous data block subgroups in the M continuous data block subgroups are respectively sent by H FlexE clients in the L FlexE clients, where H is a positive integer greater than or equal to 2, H is less than or equal to L and less than or equal to M, and G is a positive integer greater than or equal to 1 but less than or equal to R*N. In this way, a transmission rate of each timeslot is 5/H Gbit/s, and therefore, a transmission rate of a smaller granularity can be supported.

With reference to the third possible implementation of the second aspect, in a fourth possible implementation of the second aspect, the FlexE client indication field includes a first FlexE client indication subfield and a second FlexE client indication subfield; the FlexE overhead block multiframe to which the $n^{th}$ overhead block in the $t^{th}$ overhead block group belongs includes Q FlexE overhead block frames; each of R FlexE overhead block frames in the Q FlexE overhead block frames carries one such first FlexE client indication subfield, and a $g^{th}$ FlexE overhead block frame in the R FlexE overhead block frames carries one such second FlexE client indication subfield; a first FlexE client indication subfield carried in an $r'^{th}$ FlexE overhead block frame in the R FlexE overhead block frames is used to indicate a FlexE client that sends an $r'^{th}$ data block in the R data blocks in each data block subgroup in the $t^{th}$ data block group or used to indicate that an $r'^{th}$ data block in the R data blocks in each data block subgroup in the $t^{th}$ data block group is vacant; a first FlexE client indication subfield carried in the $g^{th}$ FlexE overhead block frame in the R FlexE overhead block frames is used to indicate one of the H FlexE clients that send the $G^{th}$ data blocks in the H continuous data block subgroups; and the second FlexE client indication subfield carried in the $g^{th}$ FlexE overhead block frame in the R FlexE overhead block frames is used to indicate a position of one of the H FlexE clients, in a sequence of the H FlexE clients that send the $G^{th}$ data blocks in the H continuous data block subgroups; where r'=1, . . . , R, r' is not equal to g, g is a positive integer greater than or equal to 1 but less than or equal to R, and Q is a positive integer greater than or equal to R. According to the foregoing technical solution, the position of one of the H FlexE clients, in the sequence of the H FlexE clients that send the $G^{th}$ data blocks in the H continuous data block subgroups may be determined according to a second FlexE client indication subfield carried in a $g^{th}$ FlexE overhead block frame in R FlexE overhead block frames in each of H data frames. In addition, according to the foregoing technical solution, a $G^{th}$ data block in a first data block subgroup in a first data block group in a first data frame in the H continuous data frames is sent by a first FlexE client in the H FlexE clients.

With reference to the fourth possible implementation of the second aspect, in a fifth possible implementation of the second aspect, the determining, according to the T overhead block groups, a FlexE client that sends each of the multiple data blocks includes: determining, according to a first FlexE client indication subfield carried in an $r^{th}$ FlexE overhead block frame in R FlexE overhead block frames in Q FlexE overhead block frames in a FlexE overhead block multiframe to which an $n^{th}$ overhead block in a $t^{th}$ overhead block group in each of H continuous data frames belongs, the FlexE client that sends the $r^{th}$ data block in the R data blocks in each data block subgroup in the $t^{th}$ data block group; determining, according to a first FlexE client indication subfield carried in a $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the H continuous data frames belongs, one of the H FlexE clients that send the $G^{th}$ data blocks in the H continuous data block subgroups; determining, according to a second FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the H continuous data frames belongs, the position of one of the H FlexE clients, in the sequence of the H FlexE clients that send the $G^{th}$ data blocks in the H continuous data block subgroups; and determining, according to the position of one of the H FlexE clients, in the sequence of the H FlexE clients that send the $G^{th}$ data blocks in the H continuous data block subgroups, the FlexE clients that send the $G^{th}$ data blocks in the H continuous data block subgroups, where a $G^{th}$ data block in a first data block subgroup in a first data block group in a first data frame in the H continuous data frames is sent by a first FlexE client in the H FlexE clients. According to the foregoing technical solution, the position of one of the H FlexE clients, in the sequence of the H FlexE clients that send the $G^{th}$ data blocks in the H continuous data block subgroups may be determined according to the second FlexE client indication subfield carried in the $g^{th}$ FlexE overhead block frame in the R FlexE overhead block frames in each of the H data frames.

With reference to the fourth possible implementation of the second aspect, in a sixth possible implementation of the second aspect, the FlexE client indication field further includes a third FlexE client indication subfield, each of the Q FlexE overhead block frames carries one such third FlexE client indication subfield, and each of the Q FlexE overhead block frames includes P overhead blocks; and a third FlexE client indication subfield carried in a $q^{th}$ FlexE overhead block frame in the Q FlexE overhead block frames is used to indicate whether a FlexE client that sends a $G^{th}$ data block in a first data block subgroup in a first data block group in P data block groups is a first FlexE client in the H FlexE clients, a $p^{th}$ data block group in the P data block groups is sent after a $p^{th}$ FlexE overhead block in the $q^{th}$ FlexE overhead block frame, and the $p^{th}$ data block group in the P data block groups and an overhead block group including the $p^{th}$ FlexE overhead block in the $q^{th}$ FlexE overhead block frame are continuous in the data frame, where P is a positive integer greater than or equal to 1, p=1, . . . , P, q=1, . . . , Q, and the following relationship is satisfied: T=Q*P. Based on the foregoing technical solution, if a third FlexE client indication subfield carried in an overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group, (N*P*H−1) overhead blocks are included between a next overhead block and the overhead block; the next overhead block carries a third FlexE client indication subfield indicating that a $G^{th}$ data block in a data block group is sent by the first FlexE client in the H FlexE clients, where the data block group and an overhead block group including a first overhead block in a FlexE overhead block frame to which the next overhead block belongs are continuous, and the data block group is transmitted after the overhead block group. In other words, every N*P*H overhead blocks include an overhead block, and a third FlexE client indication subfield carried in the overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group. In this way, a data block sent by the first FlexE client in the H FlexE clients may be conveniently determined.

With reference to the sixth possible implementation of the second aspect, in a seventh possible implementation of the second aspect, the determining, according to the T overhead block groups, a FlexE client that sends each of the multiple data blocks includes: determining, according to the first FlexE client indication subfield carried in the $r^{th}$ FlexE overhead block frame in the R FlexE overhead block frames, the FlexE client that sends the $r^{th}$ data block in the R data blocks in each data block subgroup in the $t^{th}$ data block group, or determining that the $r^{th}$ data block in the R data blocks in each data block subgroup in the $t^{th}$ data block group is vacant; determining, according to the first FlexE client indication subfield carried in the $g^{th}$ FlexE overhead block frame in the R FlexE overhead block frames, one of the H FlexE clients that send the $G^{th}$ data blocks in the H continuous data block subgroups; determining, according to the third FlexE client indication subfield carried in the $q^{th}$ FlexE overhead block frame in the Q FlexE overhead block frames, whether the FlexE client that sends the $G^{th}$ data block in the first data block subgroup in the first data block group in the P data block groups is the first FlexE client in the H FlexE clients; and determining, according to a quantity of the H FlexE clients and a position of the data block sent by the first FlexE client, the FlexE clients that send the $G^{th}$ data blocks in the H continuous data block subgroups. Based on the foregoing technical solution, if a third FlexE client indication subfield carried in an overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group, (N*P*H−1) overhead blocks are included between a next overhead block and the overhead block. The next overhead block carries a third FlexE client indication subfield indicating that a $G^{th}$ data block in a data block group is sent by the first FlexE client in the H FlexE clients, where the data block group and an overhead block group including a first overhead block in a FlexE overhead block frame to which the next overhead block belongs are continuous, and the data block group is transmitted after the overhead block group. In other words, every N*P*H overhead blocks include an overhead block, and a third FlexE client indication subfield carried in the overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group. In this way, a data block sent by the first FlexE client in the H FlexE clients may be conveniently determined.

With reference to any one of the second aspect, or the first possible implementation of the second aspect to the third possible implementation of the second aspect, in an eighth possible implementation of the second aspect, the FlexE client indication field included in the FlexE overhead block multiframe to which the $n^{th}$ overhead block in the $t^{th}$ overhead block group belongs includes W FlexE client indication subfields, N overhead blocks in the $t^{th}$ overhead block group respectively belong to N FlexE overhead block multiframes, each of the N FlexE overhead block multiframes includes Q FlexE overhead block frames, and the W FlexE client indication subfields are carried in W FlexE overhead block frames in the Q FlexE overhead block frames; and each of $W_1$ FlexE client indication subfields in the W FlexE client indication subfields is used to indicate a FlexE client that sends one of the R data blocks in each data block subgroup in the $t^{th}$ data block group or used to indicate that one of the R data blocks in each data block subgroup in the $t^{th}$ data block group is vacant, and each of $W_2$ FlexE client indication subfields in the W FlexE client indication subfields is used to indicate a FlexE client that sends multiple data blocks in the R data blocks in each data block subgroup in the $t^{th}$ data block group or used to indicate that multiple data blocks in the R data blocks in each data block subgroup in the $t^{th}$ data block group are vacant, where W is a positive integer greater than or equal to 1, W is less than or equal to Q, $W_1$ and $W_2$ are integers greater than or equal to 0, and $W=W_1+W_2$. An overhead block may indicate that multiple data blocks are sent by a FlexE client and indicate the FlexE client that sends the multiple data blocks. A granularity of the data blocks corresponding to the overhead block is a sum of granularities of the multiple data blocks.

With reference to any one of the second aspect, or the first possible implementation of the second aspect to the third possible implementation of the second aspect, in a ninth possible implementation of the second aspect, N overhead blocks in the $t^{th}$ overhead block group respectively belong to N FlexE overhead block multiframes, each of the N FlexE overhead block multiframes includes Q FlexE overhead block frames, each of the Q FlexE overhead block frames includes P overhead blocks, a quantity of data block groups between a $p^{th}$ overhead block and a $(p+1)^{th}$ overhead block in the P overhead blocks is K, and a quantity of overhead blocks between the $p^{th}$ overhead block and the $(p+1)^{th}$ overhead block in the P overhead blocks is N*K−1, where p=1, ..., P−1; Q, P, and K are positive integers greater than or equal to 1; and the following relationship is satisfied: T=Q*P*K. In the foregoing technical solution, a quantity of FlexE overhead block multiframes carried in a data frame is extended to N*K.

Any one of the second aspect or the possible implementations of the second aspect may be performed by a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip or a network device including a chip. The chip may be implemented by using an ASIC or an FPGA. The network device may be a router, a network switch, or a firewall. The network device may include an Ethernet interface. The Ethernet interface may include the chip.

According to a third aspect, an embodiment of the present application provides a data transmission method in flexible Ethernet FlexE, where the method is applied to a physical layer, and the method includes: receiving a first data frame by using a first physical-layer device PHY device, where a transmission rate of the first data frame is N*100 gigabits per second Gbit/s, the first data frame carries multiple data blocks from L FlexE clients, the first data frame includes T first data block groups, each of the T first data block groups includes M continuous first data block subgroups, each of the M continuous first data block subgroups includes R*N continuous data blocks, the first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the first data frame, the $t^{th}$ first overhead block group includes N continuous overhead blocks, a FlexE overhead block multiframe to which an $n^{th}$ overhead block in the $t^{th}$ first overhead block group belongs carries a FlexE client indication field, the FlexE client indication field carried in the FlexE overhead block multiframe to which the $n^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the first data frame is equal to a quantity of bits included in each overhead block in the first data frame, where L is a positive integer greater than or equal to 1, R, T, M, and N are positive integers greater than or equal to 2, t=1, ..., T, n=1, ..., N, and r=1, ..., R; and sending Y second data frames to a destination device by using Y PHY devices respectively, where a $y^{th}$ PHY device in the Y PHY devices is configured to send a $y^{th}$ second data frame in the Y second data frames, a transmission rate of the $y^{th}$ second data frame is $N_y$*100 Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes $R*N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the $y^{th}$ second data frame, the $t^{th}$ second overhead block group includes $N_y$ overhead blocks, a FlexE overhead block multiframe to which an $n_y^{th}$ overhead block in the $t^{th}$ second overhead block group belongs carries a FlexE client indication field, the FlexE client indication field carried in the FlexE overhead block multiframe to which the $n_y^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where y=1, . . . , Y, Y is a positive integer greater than or equal to 2, $N_y$ is a positive integer greater than or equal to 1, E is a positive integer greater than or equal to 1 but less than or equal to L, and $n_y$=1, . . . , $N_y$. In the foregoing technical solution, one first data frame may be extended to Y second data frames. In the foregoing technical solution, multiple data blocks in one of X data frames and overhead blocks corresponding to the data blocks may be further migrated to another data frame.

With reference to the third aspect, in a first possible implementation of the third aspect, the R data blocks in each first data block subgroup in the $t^{th}$ first data block group are an $[R*(n-1)+1]^{th}$ data block to an $(R*n)^{th}$ data block in each first data block subgroup in the $t^{th}$ first data block group; or the R data blocks in each first data block subgroup in the $t^{th}$ first data block group are $(N*s+n)^{th}$ data blocks in each first data block subgroup in the $t^{th}$ first data block group, where s=0, 1, . . . , R−1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to the third aspect or the first possible implementation of the third aspect, in a second possible implementation of the third aspect, the R data blocks in each second data block subgroup in the $t^{th}$ second data block group are an $[R*(n_y-1)+1]^{th}$ data block to an $(R*n_y)^{th}$ data block in each second data block subgroup in the $t^{th}$ second data block group; or the R data blocks in each second data block subgroup in the $t^{th}$ second data block group are $(N_y*s+n_y)^{th}$ data blocks in each second data block subgroup in the $t^{th}$ second data block group, where s=0, 1, . . . , R−1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

Any one of the third aspect or the possible implementations of the third aspect may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the first PHY device and the Y PHY devices.

According to a fourth aspect, an embodiment of the present application provides a data transmission method in flexible Ethernet FlexE, where the method is applied to a physical layer, and the method includes: receiving X first data frames by using X physical-layer devices PHY devices respectively, where an $x^{th}$ PHY device in the X PHY devices is configured to receive an $x^{th}$ first data frame in the X first data frames, a transmission rate of the $x^{th}$ first data frame is $N_x$*100 gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes $R*N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, t=1, . . . , T, $n_x$=1, . . . , $N_x$, and r=1, . . . , R; and sending a second data frame to a destination device by using a first PHY device, where a transmission rate of the second data frame is N*100 Gbit/s, the second data frame carries multiple data blocks from E FlexE clients in the L FlexE clients, the second data frame includes T second data block groups, each of the T second data block groups includes M continuous second data block subgroups, each of the M continuous second data block subgroups includes R*N continuous data blocks, the second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes N continuous overhead blocks, a FlexE overhead block multiframe to which an $n^{th}$ overhead block in the $t^{th}$ second overhead block group belongs carries a FlexE client indication field, the FlexE client indication field carried in the FlexE overhead block multiframe to which the $n^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the second data frame is equal to a quantity of bits included in each overhead block in the second data frame, where N is a positive integer greater than or equal to 2, and n=1, . . . , N. In the foregoing technical solution, X data frames may be aggregated into one second data frame.

With reference to the fourth aspect, in a first possible implementation of the fourth aspect, the R data blocks in each first data block subgroup in the $t^{th}$ first data block group are an $[R*(n_x-1)+1]^{th}$ data block to an $(R*n_x)^{th}$ data block in each first data block subgroup in the $t^{th}$ first data block group; or the R data blocks in each first data block subgroup in the $t^{th}$ first data block group are $(N_x*s+n_x)^{th}$ data blocks in each first data block subgroup in the $t^{th}$ first data block group, where s=0, 1, . . . , R−1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to the fourth aspect or the first possible implementation of the fourth aspect, in a second possible implementation of the fourth aspect, the R data blocks in each second data block subgroup in the $t^{th}$ second data block group are an $[R*(n-1)+1]^{th}$ data block to an $(R*n)^{th}$ data block in each second data block subgroup in the $t^{th}$ second data block group; or the R data blocks in each second data block subgroup in the $t^{th}$ second data block group are $(N*s+n)^{th}$ data blocks in each second data block subgroup in the $t^{th}$ second data block group, where s=0, 1, . . . , R−1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

Any one of the fourth aspect or the possible implementations of the fourth aspect may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the X PHY devices and the first PHY device.

According to a fifth aspect, an embodiment of the present application provides a data transmission method in flexible Ethernet FlexE, where the method is applied to a physical layer, and the method includes: receiving X first data frames by using X physical-layer devices PHY devices respectively, where an $x^{th}$ PHY device in the X PHY devices is configured to receive an $x^{th}$ first data frame in the X first data frames, a transmission rate of the $x^{th}$ first data frame is $N_x*100$ gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes $R*N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, t=1, . . . , T, $n_x$=1, . . . , $N_x$, and r=1, . . . , R; and sending Y second data frames to a destination device by using Y PHY devices respectively, where a $y^{th}$ PHY device in the Y PHY devices is configured to send a $y^{th}$ second data frame in the Y second data frames, a transmission rate of the $y^{th}$ second data frame is $N_y*100$ Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes $R*N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes $N_y$ continuous overhead blocks, a FlexE overhead block multiframe to which an $n_y{}^{th}$ overhead block in the $t^{th}$ second overhead block group belongs carries a FlexE client indication field, the FlexE client indication field carried in the FlexE overhead block multiframe to which the $n_y{}^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where y=1, . . . , Y, Y and $N_y$ are positive integers greater than or equal to 1, Y and $N_y$ are not equal to 1 at a same time, and $n_y$=1, . . . , $N_y$. In the foregoing technical solution, X data frames may be converted into Y data frames. For example, when X is greater than Y, X first data frames may be aggregated into Y second data frames. When X is less than Y, X first data frames may be extended to Y second data frames. In addition, in the foregoing technical solution, multiple data blocks in one of X data frames and overhead blocks corresponding to the data blocks may be further migrated to another data frame.

With reference to the fifth aspect, in a first possible implementation of the fifth aspect, the R data blocks in each first data block subgroup in the $t^{th}$ first data block group are an $[R*(n_x-1)+1]^{th}$ data block to an $(R*n_x)^{th}$ data block in each first data block subgroup in the $t^{th}$ first data block group; or the R data blocks in each first data block subgroup in the $t^{th}$ first data block group are $(N_x*s+n_x)^{th}$ data blocks in each first data block subgroup in the $t^{th}$ first data block group, where s=0, 1, . . . , R-1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

With reference to the fifth aspect or the first possible implementation of the fifth aspect, in a second possible implementation of the fifth aspect, the R data blocks in each second data block subgroup in the $t^{th}$ second data block group are an $[R*(n_y-1)+1]^{th}$ data block to an $(R*n_y)^{th}$ data block in each second data block subgroup in the $t^{th}$ second data block group; or the R data blocks in each second data block subgroup in the $t^{th}$ second data block group are $(N_y*s+n_y)^{th}$ data blocks in each second data block subgroup in the $t^{th}$ second data block group, where s=0, 1, . . . , R-1. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

Any one of the fifth aspect or the possible implementations of the fifth aspect may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the X PHY devices and the Y PHY devices.

According to a sixth aspect, an embodiment of the present application further provides a physical-layer device, where the physical-layer device includes units for performing any one of the first aspect or the possible implementations of the first aspect.

According to a seventh aspect, an embodiment of the present application further provides a physical-layer device, where the physical-layer device includes units for performing any one of the second aspect or the possible implementations of the second aspect.

According to an eighth aspect, an embodiment of the present application further provides a network device, where the network device includes units for performing any one of the third aspect or the possible implementations of the third aspect.

According to a ninth aspect, an embodiment of the present application further provides a network device, where the network device includes units for performing any one of the fourth aspect or the possible implementations of the fourth aspect.

According to a tenth aspect, an embodiment of the present application further provides a network device, where the network device includes units for performing any one of the fifth aspect or the possible implementations of the fifth aspect.

BRIEF DESCRIPTION OF DRAWINGS

To describe the technical solutions in the embodiments of the present application more clearly, the following briefly describes the accompanying drawings for describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are a part rather than all of the embodiments. All other embodiments obtained by a person of ordinary skill in the art based on the embodiments of the present application without creative efforts shall fall within the protection scope of the present application.

That A and B are continuous in this application means that when A and B are transmitted, no other transmitted data is transmitted between the transmission of A and the transmission of B. For example, that an overhead block group and a data block are continuous means that when the overhead block group and the data block are transmitted, no other transmitted data is transmitted between the transmission of the overhead block group and the transmission of the data block.

"B after A" or "B is after A" in this application means that B is transmitted after A is transmitted. For example, a data block group after an overhead block group means that the data block group is transmitted after the overhead block group.

"First" in this application refers to an element that is first transmitted in a set. For example, a first overhead block in an overhead block group is an overhead block that is first transmitted in the overhead block group. For example, a first data block in a data block group is a data block that is first transmitted in the data block group.

Data transmission in FlexE is based on a time division multiplexing mechanism. Specifically, a time-domain resource occupied by a PHY device with a 100 Gbit/s transmission rate may be divided into 20 timeslots. In each of the 20 timeslots, a transmission rate of the PHY device is 5 Gbit/s. The PHY device may send one data block in a timeslot. One FlexE client corresponds to one or more timeslots. That is, when data of a FlexE client is transmitted, one timeslot may need to be occupied, or multiple timeslots may need to be occupied. In this application, data of a FlexE client may be data sent by the FlexE client, or may be data received by the FlexE client. In addition, the 20 timeslots in the time-domain resource of the PHY device may correspond to one FlexE client or multiple FlexE clients. That is, the 20 timeslots in the time-domain resource of the PHY device may be used to transmit data of one FlexE client only, or may be used to transmit data of multiple FlexE clients. After obtaining a data block of one FlexE client, the PHY device may send the data block of the FlexE client by using a timeslot corresponding to the FlexE client.

Figure 1:
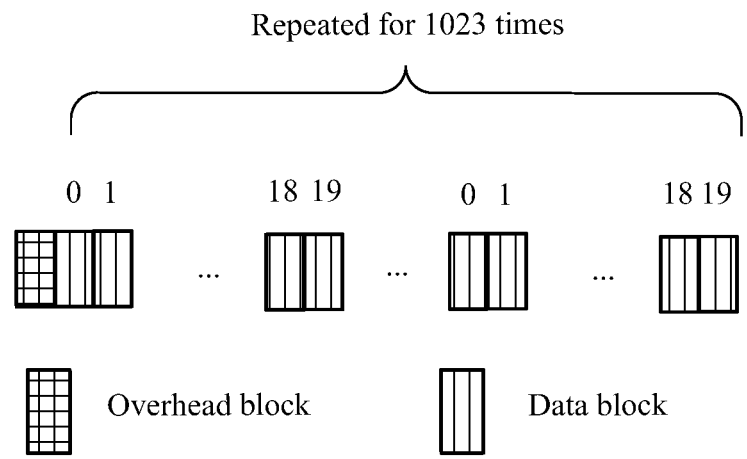
FIG. 1 is a schematic diagram of a data flow with a 100 Gbit/s transmission rate.

FIG. 1 is a schematic diagram of a data flow with a 100 Gbit/s transmission rate. FIG. 1 shows only a part of a data flow with a 100 Gbit/s transmission rate instead of a complete data flow.

A data flow with a 100 Gbit/s transmission rate consists of a data block and an overhead (OH) block. "*" in this application indicates a multiplication sign. Specifically, as shown in FIG. 1, one OH exists before every 20*1023 continuous data blocks, and the OH is adjacent to the 20*1023 data blocks. That is, before the 20*1023 continuous data blocks are transmitted, the OH is first transmitted. No other data blocks or OHs are transmitted between the transmission of the OH and the transmission of the 20*1023 continuous data blocks. Eight OHs form one FlexE overhead block frame. 32 FlexE overhead block frames form one FlexE overhead block multiframe. The FlexE overhead block multiframe includes a FlexE client indication field, and the FlexE client indication field is used to indicate a FlexE client to which each data block in the 20*1023 data blocks belongs. In this application, the FlexE client to which the data block belongs is a FlexE client that will receive the data block. A device receiving the data flow may determine, according to the received FlexE overhead block multiframe, data blocks sent by a same FlexE client, and send the data blocks sent by the same FlexE client, to a same target device. In addition, the FlexE overhead block multiframe may further include another field. For specific content of each field in the FlexE overhead block multiframe, refer to the description in the Flexible Ethernet Implementation Agreement 1.0. Details are not described herein.

Each data block in the 20*1023 data blocks may be a 64-bit or 66-bit coded data block. All data blocks mentioned in the embodiments of the present application are coded data blocks. Specifically, all the data blocks mentioned in the embodiments of the present application may be data blocks that are coded by a PCS circuit defined by the Ethernet protocol. As described above, a sending device sends a data block according to a correspondence between a timeslot and a FlexE client. When a correspondence between timeslots and FlexE clients is fixed, data blocks from a same FlexE client occupy fixed timeslots in 20 timeslots included in each period. 20 data blocks are transmitted in each period. The 20 timeslots included in each period are first to twentieth timeslots respectively. The first to the twentieth timeslots are used to transmit first to twentieth data blocks respectively. For example, all of the first, third, fifth, and seventh data blocks are data blocks from a FlexE client 1. All of the second, fourth, sixth, and eighth data blocks are data blocks from a FlexE client 2. The period in this application is a transmission period of a PHY device. A transmission period of a PHY device includes 20 timeslots.

Figure 2:
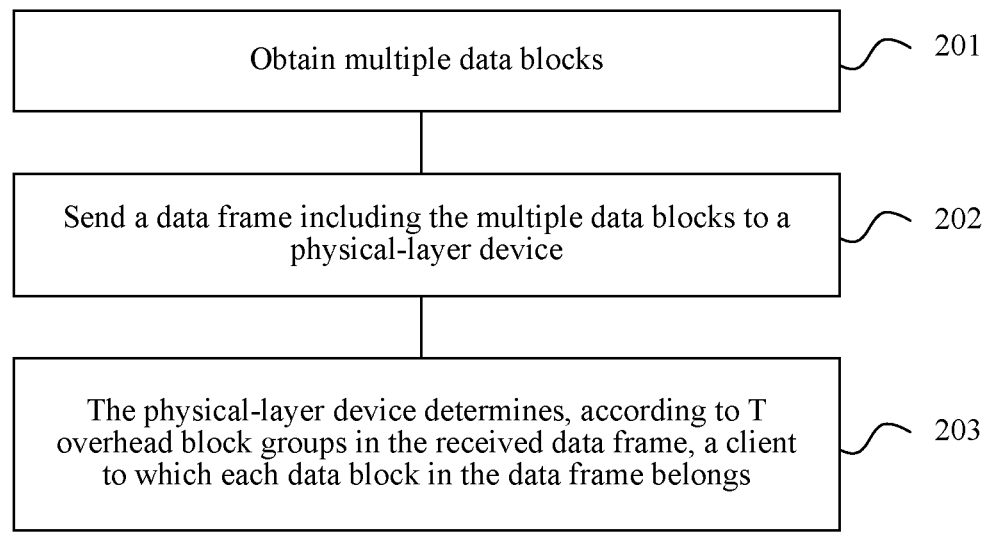
FIG. 2 is a schematic flowchart of a data transmission method in FlexE according to an embodiment of the present application.

FIG. 2 is a schematic flowchart of a data transmission method in FlexE according to an embodiment of the present application. The method is applied to a physical layer.

201. Obtain multiple data blocks, where the multiple data blocks are sent by L FlexE clients, and L is a positive integer greater than or equal to 1.

202. Send a data frame including the multiple data blocks to a physical-layer device, where a transmission rate of the data frame is N*100 gigabits per second Gbit/s, the data frame includes T data block groups, each of the T data block groups includes M continuous data block subgroups, each of the M continuous data block subgroups includes R*N continuous data blocks, the data frame further includes T overhead block groups, a $t^{th}$ overhead block group in the T overhead block groups is sent before a $t^{th}$ data block group in the T data block groups, the $t^{th}$ overhead block group and the $t^{th}$ data block group are continuous in the data frame, the $t^{th}$ overhead block group includes N continuous overhead blocks, a FlexE overhead block multiframe to which an $n^{th}$ overhead block in the $t^{th}$ overhead block group belongs carries a FlexE client indication field, the FlexE client indication field carried in the FlexE overhead block multiframe to which the $n^{th}$ overhead block in the $t^{th}$ overhead block group belongs is used to indicate a FlexE client that sends an $r^{th}$ data block in R data blocks in each data block subgroup in the $t^{th}$ data block group or used to indicate that an $r^{th}$ data block in R data blocks in each data block subgroup in the $t^{th}$ data block group is vacant, the FlexE client that sends the $r^{th}$ data block in the R data blocks in each data block subgroup in the $t^{th}$ data block group is one of the L FlexE clients, the $r^{th}$ data block in the R data blocks in each data block subgroup in the $t^{th}$ data block group is indicated only by the FlexE client indication field carried in the FlexE overhead block multiframe to which the overhead block belongs, and a quantity of bits included in each data block in the data frame is equal to a quantity of bits included in each overhead block in the data frame, where R, M, T, and N are positive integers greater than or equal to 2, t=1, . . . , T, n=1, . . . , N, and r=1, . . . , R.

203. The physical-layer device determines, according to the T overhead block groups in the received data frame, a client to which each data block in the data frame belongs.

In the method shown in FIG. 2, a quantity of data blocks in each data block subgroup in a data frame is increased from 20 specified in the Flexible Ethernet Implementation Agreement 1.0 to R*N, and a quantity of overhead blocks included in each overhead block group is increased from 1 specified in the Flexible Ethernet Implementation Agreement 1.0 to N, and therefore, a data transmission rate can be adjusted flexibly.

64/66-bit coding may be used for the data blocks in the data frame in the method shown in FIG. 2. 64/66-bit coding may also be used for the overhead blocks in the method shown in FIG. 2.

Step 201 and step 202 in the method shown in FIG. 2 may be performed by a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip or a network device including a chip. The chip may be implemented by using an ASIC or an FPGA. The network device may be a router, a network switch, or a firewall. The network device may include an Ethernet interface. The Ethernet interface may include the chip. For ease of description, the physical-layer device that performs step 201 and step 202 may be referred to as "a first physical-layer device".

Definitions of the physical-layer device mentioned in step 203 and the first physical-layer device are the same. For distinguishing, the physical-layer device mentioned in step 203 may be referred to as "a second physical-layer device".

The M data block subgroups are transmitted continuously, and when the M data block subgroups are transmitted, no other transmitted data exists between the M data block subgroups. For example, when M is equal to 2, the M continuous data block subgroups are two adjacent data block subgroups. When the two adjacent data block subgroups are transmitted, no other transmitted data is transmitted between the transmissions of the two adjacent data block subgroups. When M is equal to 3, the M continuous data block subgroups include a data block subgroup 1, a data block subgroup 2, and a data block subgroup 3. The data block subgroup 1 is first sent, and the data block subgroup 3 is finally sent. The data block subgroup 1 and the data block subgroup 2 are adjacent. No other data is transmitted between the transmission of the data block subgroup 1 and the transmission of the data block subgroup 2. No other data is transmitted between the transmission of the data block subgroup 2 and the transmission of the data block subgroup 3.

The R*N data blocks are transmitted continuously. When the R*N continuous data blocks are transmitted, no other data is transmitted between the transmissions of the R*N continuous data blocks. For example, when R=20 and N=2, the R*N data blocks are 40 continuous data blocks. When the 40 adjacent data blocks are transmitted, no other data is transmitted between the transmissions of the adjacent data blocks. A first data block in the 40 data blocks is first transmitted, and then a second data block to a $40^{th}$ data block are transmitted in sequence.

Figure 3:
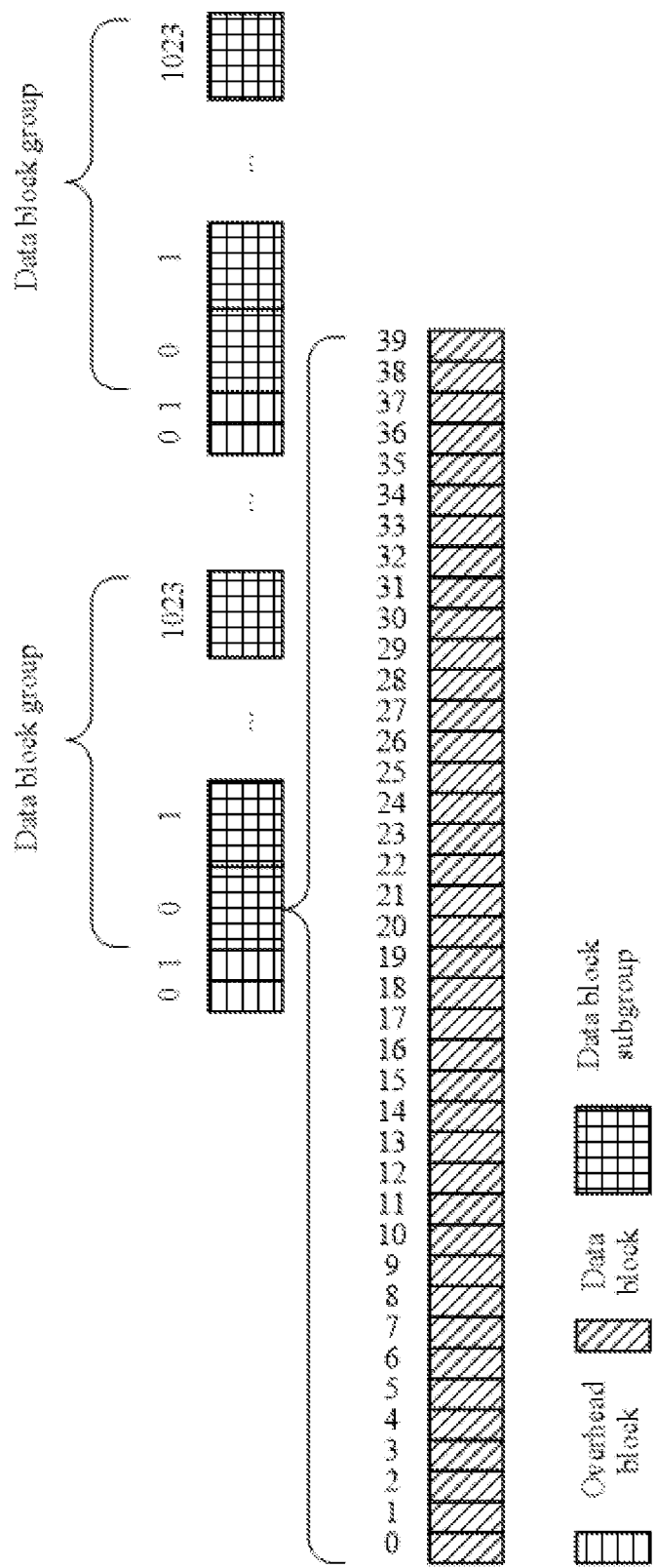
FIG. 3 is a schematic diagram of a data frame according to an embodiment of the present application.

FIG. 3 is a schematic diagram of a data frame according to an embodiment of the present application. A structure of the data frame shown in FIG. 3 is a part of a complete data frame. A transmission rate of the data frame is 200 Gbit/s. In the data frame shown in FIG. 3, a value of N is 2, values of n are 1 and 2, and a value of R is 20.

As shown in FIG. 3, each overhead block group in the data frame includes two overhead blocks. In the data frame, 1023 data block subgroups are adjacent to each overhead block group, and each data block subgroup includes 40 data blocks.

Optionally, in some implementations, the FlexE client indication field is used to indicate FlexE clients to which an $[R*(n-1)+1]^{th}$ data block to an $(R*n)^{th}$ data block in each data block subgroup in the $t^{th}$ data block group belong, where n=1, 2, . . . , N. In addition, the FlexE overhead block multiframe may further include another field. For specific content of each field in the FlexE overhead block multiframe, refer to the description about the FlexE overhead block multiframe in the Flexible Ethernet Implementation Agreement 1.0. Details are not described herein. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

For ease of description, hereinafter the $n^{th}$ overhead block corresponds to the $[R*(n-1)+1]^{th}$ data block to the $(R*n)^{th}$ data block.

The data frame shown in FIG. 3 is still used as an example for description. Each overhead block group in the data frame includes two overhead blocks. In the data frame, 1023 data block subgroups are adjacent to each overhead block group, and each data block subgroup includes 40 data blocks. As shown in FIG. 3, a first overhead block (namely, an overhead block numbered 0) in the two overhead blocks corresponds to first to twentieth data blocks (namely, data blocks numbered 0 to 19) in a first data block subgroup (namely, a data block subgroup numbered 0). A second overhead block (namely, an overhead block numbered 1) corresponds to twenty-first to fortieth data blocks (namely, data blocks numbered 20 to 39) in the first data block subgroup. Similarly, the first overhead block further corresponds to first to twentieth data blocks in a second data block subgroup (not shown in the figure), the second overhead block further corresponds to twenty-first to fortieth data blocks in the second data block subgroup, and so on. The first overhead block corresponds to first to twentieth data blocks in each data block subgroup, and the second overhead block corresponds to twenty-first to fortieth data blocks in each data block subgroup.

Similarly, if a transmission rate of a data frame is 4*100 Gbit/s, each overhead block group in the data frame includes four overhead blocks, and each data block subgroup includes 80 data blocks. A first overhead block in the four overhead blocks corresponds to first to twentieth data blocks in each data block subgroup. A second overhead block in the four overhead blocks corresponds to twenty-first to fortieth data blocks in each data block subgroup. A third overhead block in the four overhead blocks corresponds to forty-first to sixtieth data blocks in each data block subgroup. A fourth overhead block in the four overhead blocks corresponds to sixty-first to eightieth data blocks in each data block subgroup.

Optionally, in some embodiments, the FlexE client indication field is used to indicate $(N*s+n)^{th}$ data blocks in each data block subgroup in the $t^{th}$ data block group, where s=0, 1, . . . , R, and n=1, 2, . . . , N. Similarly, the FlexE overhead block multiframe may further include another field. For specific content of each field in the FlexE overhead block multiframe, refer to the description about the FlexE overhead block multiframe in the Flexible Ethernet Implementation Agreement 1.0. Details are not described herein. In the foregoing technical solution, an overhead block from a PHY device and a data block corresponding to the overhead block may be conveniently migrated to another PHY device, and N data frames whose transmission rates are 100 Gbit/s may be conveniently aggregated into one data frame whose transmission rate is N*100 Gbit/s.

For ease of description, hereinafter the $n^{th}$ overhead block corresponds to the $(N*s+n)^{th}$ data blocks.

The data frame shown in FIG. 3 is still used as an example for description. Each overhead block group in the data frame includes two overhead blocks. In the data frame, 1023 data block subgroups are adjacent to each overhead block group, and each data block subgroup includes 40 data blocks. As shown in FIG. 3, a first overhead block (namely, an overhead block numbered 0) in the two overhead blocks corresponds to first, third, fifth, . . . , thirty-ninth data blocks (namely, data blocks numbered 0, 2, . . . , 38) in a first data block subgroup (namely, a data block subgroup numbered 0). A second overhead block (namely, an overhead block numbered 1) in the two overhead blocks corresponds to second, fourth, sixth, eighth, . . . , fortieth data blocks (namely, data blocks numbered 1, 3, . . . , 39) in the first data block subgroup. Similarly, the first overhead block further corresponds to first, third, fifth, . . . , thirty-ninth data blocks in a second data block subgroup (not shown in the figure), the second overhead block further corresponds to second, fourth, sixth, eighth, . . . , fortieth data blocks in the second data block subgroup (not shown in the figure), and so on. The first overhead block corresponds to first, third, fifth, . . . , thirty-ninth data blocks in each data block subgroup. The second overhead block corresponds to second, fourth, sixth, eighth, . . . , fortieth data blocks in each data block subgroup.

Similarly, if a transmission rate of a data frame is 4*100 Gbit/s, each overhead block group in the data frame includes four overhead blocks, and each data block subgroup includes 80 data blocks. In the four overhead blocks, a first overhead block corresponds to first, fifth, ninth, . . . , seventy-third, and seventy-seventh data blocks in each data block subgroup, a second overhead block corresponds to second, sixth, tenth, . . . , seventy-fourth, and seventy-eighth data blocks in each data block subgroup, a third overhead block corresponds to third, seventh, eleventh, . . . , seventy-fifth, and seventy-ninth data blocks in each data block subgroup, and a fourth overhead block corresponds to fourth, eighth, twelfth, . . . , seventy-sixth, and eightieth data blocks in each data block subgroup.

Optionally, in some embodiments, when L is greater than or equal to 2, $G^{th}$ data blocks in any H continuous data block subgroups in the M continuous data block subgroups are sent by H FlexE clients in the L FlexE clients, where H is a positive integer greater than or equal to 2, H is less than or equal to L and less than or equal to M, and G is a positive integer greater than or equal to 1 but less than or equal to R*N. In this way, a transmission rate of each timeslot is 5/H Gbit/s, and therefore, a transmission rate of a smaller granularity can be supported.

In some embodiments, if the first physical-layer device obtains data transmitted by five or more FlexE clients, data blocks in same positions in five continuous data block subgroups may be sent by the five FlexE clients respectively. For details, refer to the embodiment shown in FIG. 4.

Figure 4:
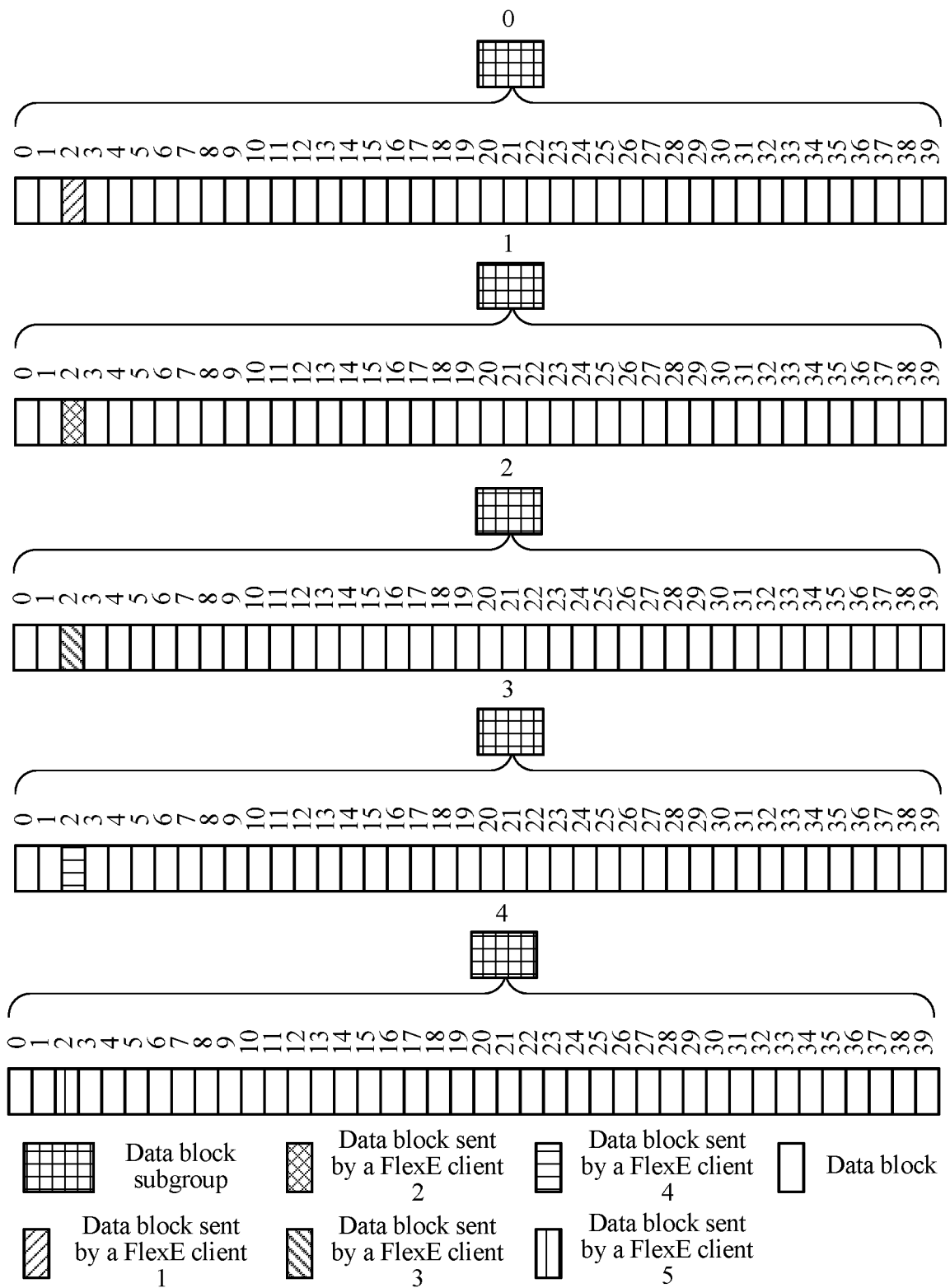
FIG. 4 is a schematic diagram of some data block subgroups according to an embodiment of the present application.

FIG. 4 is a schematic diagram of some data block subgroups according to an embodiment of the present application. In the embodiment shown in FIG. 4, a transmission rate of a data frame is 200 Gbit/s, where N=2, and R=20.

A data block subgroup 0 to a data block subgroup 4 shown in FIG. 4 may be a data block subgroup 0 to a data block subgroup 4 in any data block group in the data frame shown in FIG. 3. As shown in FIG. 4, a third data block (namely, a data block numbered 2) in the data block subgroup 0 is a data block sent by a FlexE client 1, a third data block (namely, a data block numbered 2) in the data block subgroup 1 is a data block sent by a FlexE client 2, a third data block (namely, a data block numbered 2) in the data block subgroup 2 is a data block sent by a FlexE client 3, a third data block (namely, a data block numbered 2) in the data block subgroup 3 is a data block sent by a FlexE client 4, and a third data block (namely, a data block numbered 2) in the data block subgroup 4 is a data block sent by a FlexE client 5. Other data blocks shown in FIG. 4 may be data blocks sent by any FlexE client, or may be vacant data blocks. Data blocks in data block subgroups 5 to 1023 are also sent in a format shown in the data block subgroup 0 to the data block subgroup 4 shown in FIG. 4. That is, a third data block (namely, a data block numbered 2) in the data block subgroup 5 is a data block sent by the FlexE client 1, a third data block (namely, a data block numbered 2) in the data block subgroup 6 is a data block sent by the FlexE client 2, a third data block (namely, a data block numbered 2) in the data block subgroup 7 is a data block sent by the FlexE client 3, a third data block (namely, a data block numbered 2) in the data block subgroup 8 is a data block sent by the FlexE client 4, a third data block (namely, a data block numbered 2) in the data block subgroup 9 is a data block sent by the FlexE client 5, and so on.

According to the embodiment shown in FIG. 4, a transmission rate of each timeslot is 1 Gbit/s.

Optionally, in some embodiments, the FlexE client indication field includes a first FlexE client indication subfield and a second FlexE client indication subfield. The FlexE overhead block multiframe to which the $n^{th}$ overhead block in the $t^{th}$ overhead block group belongs includes Q FlexE overhead block frames. Each of R FlexE overhead block frames in the Q FlexE overhead block frames carries one such first FlexE client indication subfield, and a $g^{th}$ FlexE overhead block frame in the R FlexE overhead block frames carries one such second FlexE client indication subfield. A first FlexE client indication subfield carried in an $r'^{th}$ FlexE overhead block frame in the R FlexE overhead block frames is used to indicate a FlexE client that sends an $r'^{th}$ data block in the R data blocks in each data block subgroup in the $t^{th}$ data block group or used to indicate that an $r'^{th}$ data block in the R data blocks in each data block subgroup in the $t^{th}$ data block group is vacant. A first FlexE client indication subfield carried in the $g^{th}$ FlexE overhead block frame in the R FlexE overhead block frames is used to indicate one of the H FlexE clients that send the $G^{th}$ data blocks in the H continuous data block subgroups. The second FlexE client indication subfield carried in the $g^{th}$ FlexE overhead block frame in the R FlexE overhead block frames is used to indicate a position of one of the H FlexE clients, in a sequence of the H FlexE clients that send the $G^{th}$ data blocks in the H continuous data block subgroups. $r'=1, \ldots, R$, $r'$ is not equal to g, g is a positive integer greater than or equal to 1 but less than or equal to R, and Q is a positive integer greater than or equal to R. In addition, according to the foregoing technical solution, a $G^{th}$ data block in a first data block subgroup in a first data block group in a first data frame in H continuous data frames is sent by a first FlexE client in the H FlexE clients.

When the FlexE client indication field includes the first FlexE client indication subfield and the second FlexE client indication subfield, the second physical-layer device may determine the H FlexE clients according to the first FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the received H continuous data frames belongs. The second physical-layer device may determine the sequence of the H FlexE clients according to a second FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the received H continuous data frames belongs.

The determining, by the second physical-layer device according to the T overhead block groups, a FlexE client that sends each of the multiple data blocks includes: determining, by the second physical-layer device according to a first FlexE client indication subfield carried in an $r'^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the H continuous data frames belongs, the FlexE client that sends the $r'^{th}$ data block in the R data blocks in each data block subgroup in the $t^{th}$ data block group; determining, by the second physical-layer device according to the first FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the H continuous data frames belongs, one of the H FlexE clients that send the $G^{th}$ data blocks in the H continuous data block subgroups; determining, by the second physical-layer device according to the second FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the H continuous data frames belongs, the position of one of the H FlexE clients, in the sequence of the H FlexE clients that send the $G^{th}$ data blocks in the H continuous data block subgroups; and determining, by the second physical-layer device according to the position of one of the H FlexE clients, in the sequence of the H FlexE clients that send the $G^{th}$ data blocks in the H continuous data block subgroups, the FlexE clients that send the $G^{th}$ data blocks in the H continuous data block subgroups, where the $G^{th}$ data block in the first data block subgroup in the first data block group in the first data frame in the H continuous data frames is sent by the first FlexE client in the H FlexE clients.

After the second physical-layer device determines the H FlexE clients and the sequence of the H FlexE clients, the second physical-layer device may determine, according to the sequence of the H FlexE clients, which FlexE client sends the $G^{th}$ data block in each data block subgroup in each data block group. Specifically, the second physical-layer device may determine that the $G^{th}$ data block in the first data block subgroup in the first data block group corresponding to the FlexE overhead block multiframe to which the FlexE overhead block frame used to indicate the first FlexE client belongs, is sent by the first FlexE client. Similarly, the second physical-layer device may determine that a $G^{th}$ data block in an $h^{th}$ data block subgroup in the first data block group corresponding to the FlexE overhead block multiframe to which the FlexE overhead block frame used to indicate the first FlexE client belongs, is sent by an $h^{th}$ FlexE client in the H FlexE clients (h is a positive integer greater than or equal to 1 but less than or equal to H). The second physical-layer device may continue to determine that a $G^{th}$ data block in an $(H+h)^{th}$ data block subgroup in the first data block group corresponding to the FlexE overhead block multiframe to which the FlexE overhead block frame used to indicate the first FlexE client belongs, is sent by the $h^{th}$ FlexE client in the H FlexE clients. The second physical-layer device may set a counter. Every time a FlexE client that sends a $G^{th}$ data block in a data block subgroup is determined, 1 may be added to the counter. When a value of the counter is H, the counter is cleared, and counting is restarted. In this way, the second physical-layer device may determine which FlexE client in the H FlexE clients sends the $G^{th}$ data block in each data block subgroup in each data block group in the H data frames.

The embodiment shown in FIG. 4 is still used as an example. It is assumed that in the embodiment shown in FIG. 4, a FlexE overhead block multiframe to which an overhead block in a data frame belongs consists of 32 FlexE overhead block frames, and that each FlexE overhead block frame consists of eight overhead block groups. The FlexE overhead block frame may carry a FlexE client indication field. The FlexE client indication field includes a first FlexE client indication subfield and a second FlexE client indication subfield. A first FlexE overhead block frame in the 32

FlexE overhead block frames may carry a first FlexE client indication subfield. The first FlexE client indication subfield carried in the first FlexE overhead block frame may be used to indicate a first data block in 20 data blocks. Specifically, if the first data block in the 20 data blocks is sent by a FlexE client, the first FlexE client indication subfield carried in the first FlexE overhead block frame may be used to indicate a FlexE client that sends the first data block in the 20 data blocks. If the first data block in the 20 data blocks is vacant, the first FlexE client indication subfield carried in the first FlexE overhead block frame may be used to indicate that the first data block in the 20 data blocks is vacant. Similarly to the first FlexE overhead block frame, an $r'^{th}$ FlexE overhead block frame in first 20 FlexE overhead block frames in the 32 FlexE overhead block frames may also carry a first FlexE client indication subfield and a second FlexE client indication subfield, where r' is a positive integer greater than 1 but less than or equal to 20, and r' is not equal to 3. The first FlexE client indication subfield carried in the $r'^{th}$ FlexE overhead block frame is used to indicate an $r'^{th}$ data block in 20 data blocks. In this way, the second physical-layer device may determine, according to the first FlexE client indication subfield carried in the $r'^{th}$ FlexE overhead block frame, which FlexE client sends the $r'^{th}$ data block in the 20 data blocks or that the $r'^{th}$ data block in the 20 data blocks is vacant.

In addition, a first FlexE client indication subfield carried in a third FlexE overhead block frame in the 20 FlexE overhead block frames is used to indicate a FlexE client in five FlexE clients. A second FlexE client indication subfield carried in the third FlexE overhead block frame is used to indicate a position of the FlexE client in a sequence of the five FlexE clients. That is, the first physical-layer device needs to send five continuous data frames to the second physical-layer device separately, where first FlexE client indication subfields and second FlexE client indication subfields in third FlexE overhead block frames in the five FlexE overhead block multiframes in the five continuous data frames indicate the five FlexE clients and the sequence of the five FlexE clients. It may be understood that, sequence numbers of overhead blocks included in the five FlexE overhead block multiframes are the same in all overhead block groups.

The second physical-layer device receives the five continuous data frames. The second physical-layer device determines the five FlexE clients, positions of data blocks sent by the five FlexE clients in the 20 data blocks, and the sequence of the five FlexE clients according to the first FlexE client indication subfield and the second FlexE client indication subfield that are carried in the third FlexE overhead block frame in each of the FlexE overhead block multiframes in the five data frames. The second physical-layer device may determine: a third data block (namely, a data block numbered 2) in a first data block subgroup (namely, a data block subgroup 0) in a first data block group in a first data frame in the five continuous data frames is a data block sent by a FlexE client 1, a third data block (namely, a data block numbered 2) in a second data block subgroup (namely, a data block subgroup 1) in the first data block group in the first data frame in the five continuous data frames is a data block sent by a FlexE client 2, a third data block (namely, a data block numbered 2) in a third data block subgroup (namely, a data block subgroup 2) in the first data block group in the first data frame in the five continuous data frames is a data block sent by a FlexE client 3, a third data block (namely, a data block numbered 2) in a fourth data block subgroup (namely, a data block subgroup 3) in the first data block group in the first data frame in the five continuous data frames is a data block sent by a FlexE client 4, a third data block (namely, a data block numbered 2) in a fifth data block subgroup (namely, a data block subgroup 4) in the first data block group in the first data frame in the five continuous data frames is a data block sent by a FlexE client 5, a third data block (namely, a data block numbered 2) in a sixth data block subgroup (namely, a data block subgroup 5) in the first data block group in the first data frame in the five continuous data frames is a data block sent by a FlexE client 1, and so on.

Further, in some embodiments, the FlexE client indication field further includes a third FlexE client indication subfield, each of the Q FlexE overhead block frames carries one such third FlexE client indication subfield, and each of the Q FlexE overhead block frames includes P overhead blocks. A third FlexE client indication subfield carried in a $q^{th}$ FlexE overhead block frame in the Q FlexE overhead block frames is used to indicate whether a FlexE client that sends a $G^{th}$ data block in a first data block subgroup in a first data block group in P data block groups is a first FlexE client in the H FlexE clients, a $p^{th}$ data block group in the P data block groups is sent after a $p^{th}$ FlexE overhead frame in the $q^{th}$ FlexE overhead block frame, and the $p^{th}$ data block group in the P data block groups and an overhead block group including the $p^{th}$ FlexE overhead frame in the $q^{th}$ FlexE overhead block frame are continuous in the data frame, where P is a positive integer greater than or equal to 1, and the following relationship is satisfied: T=Q*P. For ease of description, hereinafter the P data block groups may be referred to as data block groups corresponding to the $q^{th}$ FlexE overhead block frame.

It may be understood that, the first FlexE client indication subfield may be carried by an overhead block in a FlexE overhead block frame. The second FlexE client indication subfield may be carried by an overhead block in a FlexE overhead block frame. The third FlexE client indication subfield may be carried by an overhead block in a FlexE overhead block frame. For example, a third overhead block in P overhead blocks included in each of R FlexE overhead block frames may be used to carry the first FlexE client indication subfield. A third overhead block in P overhead blocks included in a $g^{th}$ FlexE overhead block frame in the R FlexE overhead block frames may be used to carry the second FlexE client indication subfield. A third overhead block in the P overhead blocks included in each of the Q FlexE overhead block frames may be used to carry the third FlexE client indication subfield. Therefore, if a third FlexE client indication subfield carried in an overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group, (N*P*H−1) overhead blocks are included between a next overhead block and the overhead block. The next overhead block carries a third FlexE client indication subfield indicating that a $G^{th}$ data block in a data block group is sent by the first FlexE client in the H FlexE clients, where the data block group and an overhead block group including a first overhead block in a FlexE overhead block frame to which the next overhead block belongs are continuous, and the data block group is transmitted after the overhead block group. In other words, every N*P*H overhead blocks include an overhead block, and a third FlexE client indication subfield carried in the overhead block indicates that a $G^{th}$ data block in a data block group is sent by the first FlexE client in the H FlexE clients, where the data block group and an overhead block group including a first overhead block in a FlexE overhead block frame to which the overhead block belongs are continuous, and the data block group is transmitted after the overhead block group.

When the FlexE client indication field further includes the third FlexE client indication subfield, the second physical-layer device may determine the H FlexE clients according to the first FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the received H continuous data frames belongs. The second physical-layer device may determine the sequence of the H FlexE clients according to the second FlexE client indication subfield carried in the $g^{th}$ FlexE overhead block frame in the R FlexE overhead block frames in the Q FlexE overhead block frames in the FlexE overhead block multiframe to which the $n^{th}$ overhead block in the $t^{th}$ overhead block group in each of the received H continuous data frames belongs. The second physical-layer device may determine, according to the third FlexE client indication subfield in each FlexE overhead frame, which FlexE client sends the $G^{th}$ data block in each data block subgroup.

The determining, by the second physical-layer device according to the T overhead block groups, a FlexE client that sends each of the multiple data blocks includes: determining, by the second physical-layer device according to the first FlexE client indication subfield carried in the $r^{th}$ FlexE overhead block frame in the R FlexE overhead block frames, the FlexE client that sends the $r^{th}$ data block in the R data blocks in each data block subgroup in the $t^{th}$ data block group, or determining that the $r^{th}$ data block in the R data blocks in each data block subgroup in the $t^{th}$ data block group is vacant; determining, by the second physical-layer device according to the first FlexE client indication subfield carried in the $g^{th}$ FlexE overhead block frame in the R FlexE overhead block frames, one of the H FlexE clients that send the $G^{th}$ data blocks in the H continuous data block subgroups; determining, by the second physical-layer device according to the third FlexE client indication subfield carried in the $q^{th}$ FlexE overhead block frame in the Q FlexE overhead block frames, whether the FlexE client that sends the $G^{th}$ data block in the first data block subgroup in the first data block group in the P data block groups is the first FlexE client in the H FlexE clients; and determining, by the second physical-layer device according to a quantity of the H FlexE clients and a position of the data block sent by the first FlexE client, the FlexE clients that send the $G^{th}$ data blocks in the H continuous data block subgroups.

After the second physical-layer device determines the H FlexE clients and the sequence of the H FlexE clients, the second physical-layer device may determine, according to the third FlexE client indication subfield in each FlexE overhead frame, which FlexE client sends the $G^{th}$ data block in each data block subgroup. Specifically, the second physical-layer device may determine, according to the third FlexE client indication subfield, that a $G^{th}$ data block in a first data block subgroup in a data block group is sent by the first FlexE client in the H FlexE clients. After the second physical-layer device determines that the $G^{th}$ data block in the first data block subgroup in the data block group is sent by the first FlexE client in the H FlexE clients, the second physical-layer device may determine that a $G^{th}$ data block in an $h^{th}$ data block subgroup in the data block group is sent by the $h^{th}$ FlexE client in the H FlexE clients. The second physical-layer device may continue to determine that a $G^{th}$ data block in an $(H+h)^{th}$ data block subgroup in the data block group is sent by the $h^{th}$ FlexE client in the H FlexE clients. In this way, the second physical-layer device may determine which FlexE client in the H FlexE clients sends the $G^{th}$ data block in each data block subgroup in each data block group. In the foregoing technical solution, after N*P*H overhead blocks and corresponding data block groups pass by, the second physical-layer device may determine that the $G^{th}$ data block in the first data block subgroup in the first data block group is sent by the first FlexE client in the H FlexE clients.

The embodiment shown in FIG. 4 is still used as an example. Each of the 32 FlexE overhead block frames carries a third FlexE client indication subfield. The third FlexE client indication subfield carried in each of the 32 FlexE overhead block frames is used to indicate whether a third data block in a first data block subgroup in a data block group is sent by a first FlexE client in the five FlexE clients, where the data block group and an overhead block group including a first overhead block in each FlexE overhead block frame are continuous, and the data block group is transmitted after the overhead block group. Each FlexE overhead block frame consists of eight overhead block groups, and third data blocks in five continuous data block subgroups are sent by the five FlexE clients respectively. Therefore, 5*8*2 overhead blocks may include an overhead block, and a third FlexE client indication subfield carried in the overhead block indicates that a third data block in a first data block group is sent by the first FlexE client 1, where the data block group and an overhead block group including a first overhead block in a FlexE overhead block frame to which the overhead block belongs are continuous, and the data block group is transmitted after the overhead block group.

Optionally, in some embodiments, the second FlexE client indication subfield may include a first field, a second field, and a third field. The first field is used to indicate whether multiple FlexE clients share a corresponding timeslot. The second field is used to indicate a transmission rate of the timeslot. The third field is used to indicate a sequence of FlexE clients that send data blocks in the timeslot. A FlexE overhead block frame carrying the second FlexE client indication subfield also carries a first FlexE client indication subfield. The first FlexE client indication subfield is used to indicate which FlexE client sends a data block. The corresponding timeslot is a timeslot occupied by the data block.

In some embodiments, the $r^{th}$ FlexE overhead block frame in the R FlexE overhead block frames may also carry the second FlexE client indication subfield. The second FlexE client indication subfield carried in the $r^{th}$ FlexE overhead block frame is used to indicate a timeslot occupied by a FlexE client.

In some embodiments, if a FlexE overhead block frame does not carry the second FlexE client indication subfield and the FlexE overhead block frame carries a first FlexE client indication subfield, all corresponding data blocks in each data block subgroup are sent by a FlexE client indicated by the first FlexE client indication subfield.

Optionally, in some embodiments, the FlexE client indication field included in the FlexE overhead block multiframe to which the $n^{th}$ overhead block in the $t^{th}$ overhead block group belongs includes W FlexE client indication subfields, N overhead blocks in the $t^{th}$ overhead block group respectively belong to N FlexE overhead block multiframes, each of the N FlexE overhead block multiframes includes Q FlexE overhead block frames, and the W FlexE client indication subfields are carried in W FlexE overhead block frames in the Q FlexE overhead block frames. $W_1$ FlexE client indication subfields in the W FlexE client indication subfields are used to indicate a FlexE client that sends one of the R data blocks in each data block subgroup in the $t^{th}$ data block group or used to indicate that one of the R data blocks in each data block subgroup in the $t^{th}$ data block group is vacant, and $W_2$ FlexE client indication subfields in the W FlexE client indication subfields are used to indicate a FlexE client that sends multiple data blocks in the R data blocks in each data block subgroup in the $t^{th}$ data block group or used to indicate that multiple data blocks in the R data blocks in each data block subgroup in the $t^{th}$ data block group are vacant, where W is a positive integer greater than or equal to 1, W is less than or equal to Q, $W_1$ and $W_2$ are integers greater than or equal to 0, and $W=W_1+W_2$. According to the foregoing technical solution, an overhead block may indicate that multiple data blocks are sent by a FlexE client and indicate the FlexE client that sends the multiple data blocks. In this way, a granularity of the data blocks corresponding to the overhead block is a sum of granularities of the multiple data blocks.

For example, in some embodiments, assuming R=20, the FlexE client indication field may further include 20 FlexE client indication subfields, and each of the 20 FlexE client indication subfields may indicate that one of 20 data blocks is sent by a FlexE client and indicate the FlexE client that sends the data block.

For another example, in some embodiments, assuming R=20, a FlexE client indication subfield in the FlexE client indication field may indicate that five data blocks in 20 data blocks are sent by a FlexE client and indicate the FlexE client that sends the five data blocks. The FlexE client indication subfield may be carried in an overhead block. In this case, assuming that a transmission rate of each data block is 5 Gbit/s, the overhead block carrying the FlexE client indication subfield corresponds to five data blocks, and a sum of transmission rates of the five data blocks is 25 Gbit/s. Another FlexE client indication subfield in the FlexE client indication field may indicate that 10 data blocks in the 20 data blocks are sent by a FlexE client and indicate the FlexE client that sends the 10 data blocks. The FlexE client indication subfield may be carried in an overhead block. In this case, assuming that a transmission rate of each data block is 5 Gbit/s, the overhead block carrying the FlexE client indication subfield corresponds to 10 data blocks, and a sum of transmission rates of the 10 data blocks is 50 Gbit/s. In addition, the FlexE client indication field may further include other five FlexE client indication subfields, and each of the five FlexE client indication subfields may indicate that one of the 20 data blocks is sent by a FlexE client and indicate the FlexE client that sends the data block.

For another example, in some embodiments, assuming R=20, the FlexE client indication field may include three FlexE client indication subfields. Each of two FlexE client indication subfields in the three FlexE client indication subfields may indicate that five data blocks in 20 data blocks are sent by a FlexE client and indicate the FlexE client that sends the five data blocks. Each of the two FlexE client indication subfields may be carried in an overhead block. In this case, assuming that a transmission rate of each data block is 5 Gbit/s, the overhead block carrying the FlexE client indication subfield corresponds to five data blocks, and a sum of transmission rates of the five data blocks is 25 Gbit/s. Another FlexE client indication subfield in the three FlexE client indication subfields may indicate that 10 data blocks in the 20 data blocks are sent by a FlexE client and indicate the FlexE client that sends the 10 data blocks. The FlexE client indication subfield may be carried in an overhead block. In this case, assuming that a transmission rate of each data block is 5 Gbit/s, the overhead block carrying the FlexE client indication subfield corresponds to 10 data blocks, and a sum of transmission rates of the 10 data blocks is 50 Gbit/s.

Further, in some embodiments, each of $W_2$ FlexE client indication subfields indicates that multiple data blocks sent by a FlexE client are continuous.

Optionally, in some embodiments, N overhead blocks in each overhead block group respectively belong to N FlexE overhead block multiframes, each of the N FlexE overhead block multiframes includes Q FlexE overhead block frames, each of the Q FlexE overhead block frames includes P overhead blocks, a quantity of data block groups between a $p^{th}$ overhead block and a $(p+1)^{th}$ overhead block in the P overhead blocks is K, and a quantity of overhead blocks between the $p^{th}$ overhead block and the $(p+1)^{th}$ overhead block in the P overhead blocks is $N*K-1$, where $p=1, \ldots, P-1$; Q, P, and K are positive integers greater than or equal to 1; and the following relationship is satisfied: $T=Q*P*K$. In comparison with a technical solution in which a transmission rate is 100 Gbit/s, a quantity of FlexE overhead block multiframes carried in a data frame is extended to $N*K$ in the foregoing technical solution. In addition, in this case, a transmission rate of each timeslot is $100/(R*K)$ Gbit/s. For example, if K=1 and R=20, the transmission rate of each timeslot is 5 Gbit/s. For another example, if K=2 and R=20, the transmission rate of each timeslot is 2.5 Gbit/s. In this way, the transmission rate of each timeslot may be adjusted flexibly.

Optionally, in some embodiments, a value of R may be 20. In this way, a quantity of data blocks in each data block subgroup corresponding to each overhead block is the same as a quantity of data blocks corresponding to each overhead block in the current OIF FlexE standard.

Optionally, in other embodiments, a value of R may be another value. In this way, a transmission rate of a timeslot occupied by each data block may be different from a transmission rate in the current OIF FlexE standard. The transmission rate of the timeslot occupied by each data block may be (100/R) Gbit/s. For example, if a value of R is 40 and a value of K is 1, the transmission rate of the timeslot occupied by each data block may be 2.5 Gbit/s.

Specifically, overhead blocks in the data frame may form $N*K$ FlexE overhead block multiframes, and each overhead block multiframe consists of $P*Q$ overhead blocks. Specifically, each FlexE overhead block multiframe consists of Q FlexE overhead block frames, and each FlexE overhead block frame consists of P overhead blocks.

In some embodiments, each overhead block included in an overhead block group may be an overhead block specified in the Flexible Ethernet Implementation Agreement 1.0. In this case, a FlexE overhead block frame may also be referred to as a FlexE overhead block frame, and a FlexE overhead block multiframe may also be referred to as a FlexE overhead block multiframe. Content carried in each field in the FlexE overhead multiframe is consistent with content carried in each field in the FlexE overhead block multiframe specified in the Flexible Ethernet Implementation Agreement 1.0. In other embodiments, one or more overhead blocks in an overhead block group are overhead blocks specified in the Flexible Ethernet Implementation Agreement 1.0, and other overhead blocks may not be overhead blocks specified in the Flexible Ethernet Implementation Agreement 1.0. In this case, content carried in each field in the FlexE overhead block multiframe may be consistent with content of each field specified in the Flexible Ethernet Implementation Agreement 1.0. Some specific fields may also be added to or removed from the FlexE overhead block multiframe on a basis of the FlexE overhead block multiframe specified in the Flexible Ethernet Implementation Agreement 1.0.

Figure 5:
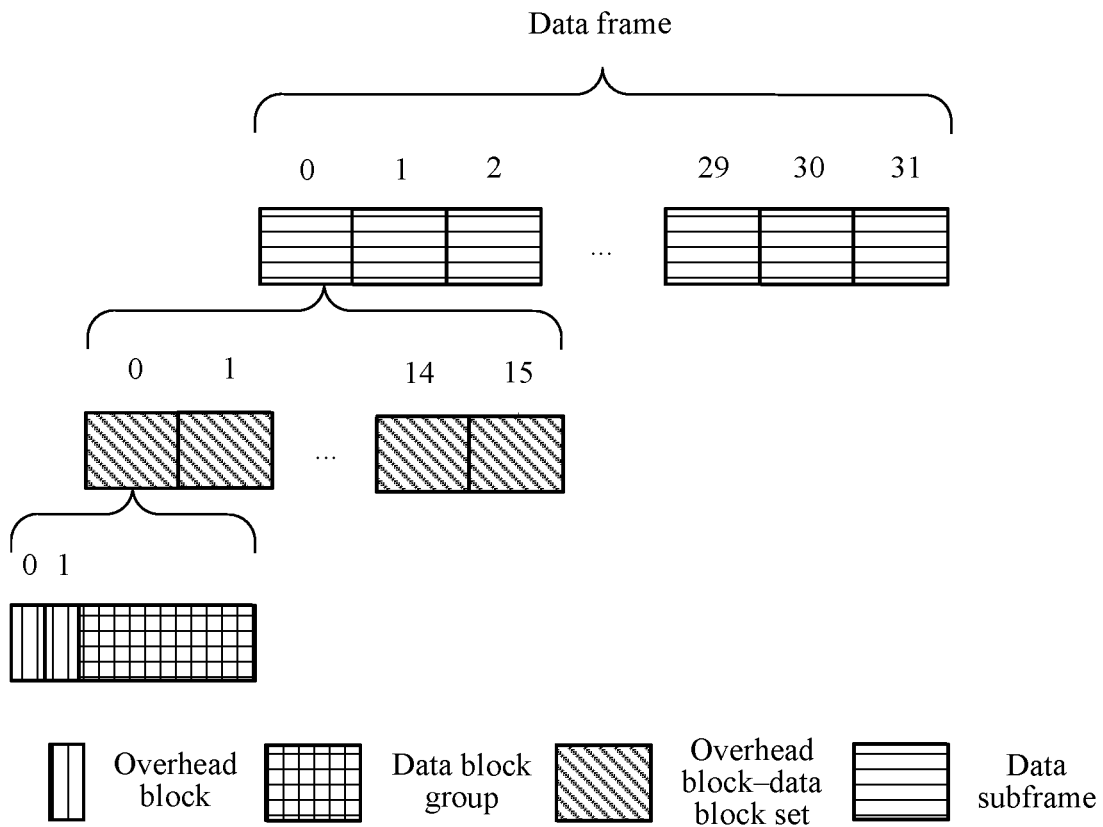
FIG. 5 is a schematic diagram of another data frame according to an embodiment of the present application.

FIG. 5 is a schematic diagram of another data frame according to an embodiment of the present application. A structure of the data frame shown in FIG. 5 is a complete data frame. The data frame is sent by a PHY device, and a transmission rate of the data frame is 200 Gbit/s. For ease of description, specific structures of a data block group and a data block subgroup are not shown in FIG. 5. A correspondence between an overhead block and a data block in FIG. 5 may be the same as that in the foregoing embodiment. Details are not described again herein.

Because the transmission rate of the data frame is 200 Gbit/s, N=2. In addition, assume K=2, P=8, and Q=32. Overhead blocks in the data frame shown in FIG. 5 may form four FlexE overhead block multiframes. Each FlexE overhead block multiframe consists of 32 FlexE overhead block frames, and each FlexE overhead block frame consists of 8 overhead blocks. A correspondence between each of the four FlexE overhead block multiframes and an overhead block is shown in Table 1. For ease of description, an overhead block group and a data block group adjacent to the overhead block group are referred to as an overhead block—data block set, and K*P continuous overhead block—data block sets are referred to as a data subframe. The data frame shown in FIG. 5 includes 32 data subframes in total. Each data subframe includes 16 overhead block—data block sets.

TABLE 1

| FlexE overhead block multiframe number | Data subframe number | Overhead block-data block set number | Overhead block number |
|---|---|---|---|
| 0 | 0, 1, 2, . . . , 31 | 0, 2, 4, . . . , 14 | 0 |
| 1 | 0, 1, 2, . . . , 31 | 0, 2, 4, . . . , 14 | 1 |
| 2 | 0, 1, 2, . . . , 31 | 1, 3, 5, . . . , 15 | 0 |
| 3 | 0, 1, 2, . . . , 31 | 1, 3, 5, . . . , 15 | 1 |

Using a FlexE overhead block multiframe numbered 0 as an example, overhead blocks forming the FlexE overhead block multiframe 0 are respectively overhead blocks numbered 0 in overhead block—data block sets 0, 2, 4, . . . , 14 in data subframes 0 to 31.

Figure 6:
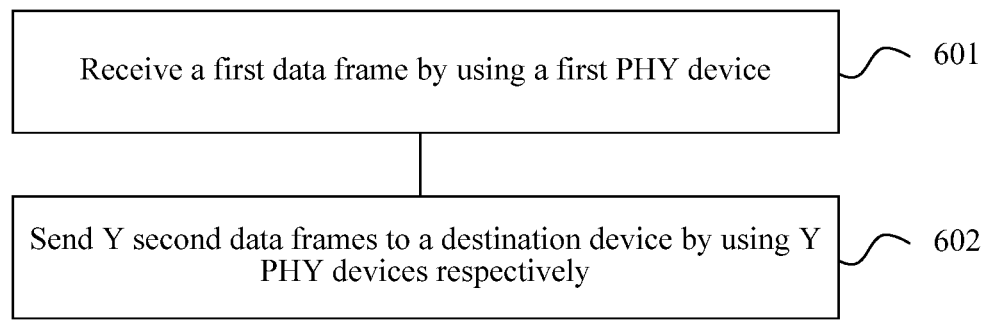
FIG. 6 is a schematic flowchart of another data transmission method in FlexE according to an embodiment of the present application.

FIG. 6 is a schematic flowchart of another data transmission method in FlexE according to an embodiment of the present application. The method is applied to a physical layer.

601. Receive a first data frame by using a first PHY device, where a transmission rate of the first data frame is N*100 gigabits per second Gbit/s, the first data frame carries multiple data blocks from L FlexE clients, the first data frame includes T first data block groups, each of the T first data block groups includes M continuous first data block subgroups, each of the M continuous first data block subgroups includes R*N continuous data blocks, the first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the first data frame, the $t^{th}$ first overhead block group includes N continuous overhead blocks, a FlexE overhead block multiframe to which an $n^{th}$ overhead block in the $t^{th}$ first overhead block group belongs carries a FlexE client indication field, the FlexE client indication field carried in the FlexE overhead block multiframe to which the $n^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the first data frame is equal to a quantity of bits included in each overhead block in the first data frame, where L is a positive integer greater than or equal to 1, R, T, M, and N are positive integers greater than or equal to 2, t=1, . . . , T, n=1, . . . , N, and r=1, . . . , R.

602. Send Y second data frames to a destination device by using Y PHY devices respectively, where a $y^{th}$ PHY device in the Y PHY devices is configured to send a $y^{th}$ second data frame in the Y second data frames, a transmission rate of the $y^{th}$ second data frame is $N_y$*100 Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes R*$N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the $y^{th}$ second data frame, the $t^{th}$ second overhead block group includes $N_y$ overhead blocks, a FlexE overhead block multiframe to which an $n_y^{th}$ overhead block in the $t^{th}$ second overhead block group belongs carries a FlexE client indication field, the FlexE client indication field carried in the FlexE overhead block multiframe to which the $n_y^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where y=1, . . . , Y, Y is a positive integer greater than or equal to 2, $N_y$ is a positive integer greater than or equal to 1, E is a positive integer greater than or equal to 1 but less than or equal to L, and $n_y$=1, . . . , $N_y$.

In the method shown in FIG. 6, one first data frame may be extended to Y second data frames. In the method shown in FIG. 6, multiple data blocks in one of X data frames and overhead blocks corresponding to the data blocks may be further migrated to another data frame.

The method shown in FIG. 6 may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the first PHY device and the Y PHY devices.

The destination device mentioned in the method shown in FIG. 6 may be a physical-layer device, a network device, a PHY device, or a chip.

Optionally, in some embodiments, the R data blocks in each first data block subgroup in the $t^{th}$ first data block group are an $[R*(n-1)+1]^{th}$ data block to an $(R*n)^{th}$ data block in each first data block subgroup in the $t^{th}$ first data block group; or the R data blocks in each first data block subgroup in the $t^{th}$ first data block group are $(N*s+n)^{th}$ data blocks in each first data block subgroup in the $t^{th}$ first data block group, where s=0, 1, . . . , R−1.

Optionally, in some embodiments, the R data blocks in each second data block subgroup in the $t^{th}$ second data block group are an $[R*(n_y-1)+1]^{th}$ data block to an $(R*n_y)^{th}$ data block in each second data block subgroup in the $t^{th}$ second data block group; or the R data blocks in each second data block subgroup in the $t^{th}$ second data block group are $(N_y*s+n_y)^{th}$ data blocks in each second data block subgroup in the $t^{th}$ second data block group, where s=0, 1, . . . , R−1.

Figure 7:
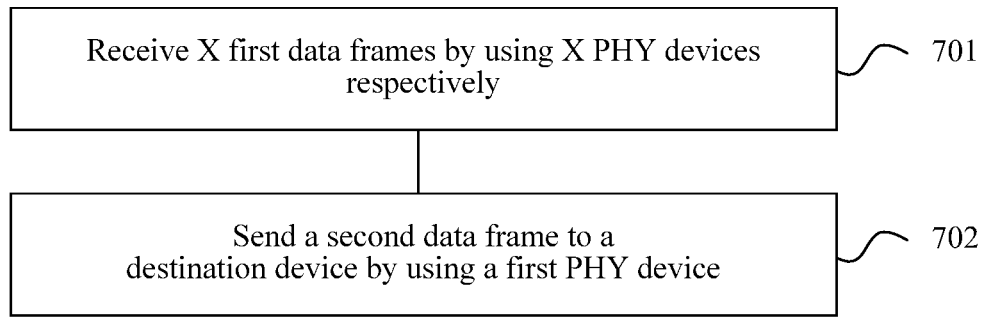
FIG. 7 is a data transmission method in flexible Ethernet FlexE according to an embodiment of the present application.

FIG. 7 is a data transmission method in flexible Ethernet FlexE according to an embodiment of the present application. The method is applied to a physical layer.

701. Receive X first data frames by using X PHY devices respectively, where an $x^{th}$ PHY device in the X PHY devices is configured to receive an $x^{th}$ first data frame in the X first data frames, a transmission rate of the $x^{th}$ first data frame is $N_x*100$ gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes $R*N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, t=1, . . . , T, $n_x$=1, . . . , $N_x$, and r=1, . . . , R.

702. Send a second data frame to a destination device by using a first PHY device, where a transmission rate of the second data frame is $N*100$ Gbit/s, the second data frame carries multiple data blocks from E FlexE clients in the L FlexE clients, the second data frame includes T second data block groups, each of the T second data block groups includes M continuous second data block subgroups, each of the M continuous second data block subgroups includes $R*N$ continuous data blocks, the second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes N continuous overhead blocks, a FlexE overhead block multiframe to which an $n^{th}$ overhead block in the $t^{th}$ second overhead block group belongs carries a FlexE client indication field, the FlexE client indication field carried in the FlexE overhead block multiframe to which the $n^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the second data frame is equal to a quantity of bits included in each overhead block in the second data frame, where N is a positive integer greater than or equal to 2, and n=1, . . . , N.

In the method shown in FIG. 7, X data frames may be aggregated into one second data frame.

The method shown in FIG. 7 may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the X PHY devices and the first PHY device.

The destination device mentioned in the method shown in FIG. 7 may be a physical-layer device, a network device, a PHY device, or a chip.

Optionally, in some embodiments, the R data blocks in each first data block subgroup in the $t^{th}$ first data block group are an $[R*(n_x-1)+1]^{th}$ data block to an $(R*n_x)^{th}$ data block in each first data block subgroup in the $t^{th}$ first data block group; or the R data blocks in each first data block subgroup in the $t^{th}$ first data block group are $(N_x*s+n_x)^{th}$ data blocks in each first data block subgroup in the $t^{th}$ first data block group, where s=0, 1, . . . , R−1.

Optionally, in some embodiments, the R data blocks in each second data block subgroup in the $t^{th}$ second data block group are an $[R*(n-1)+1]^{th}$ data block to an $(R*n)^{th}$ data block in each second data block subgroup in the $t^{th}$ second data block group; or the R data blocks in each second data block subgroup in the $t^{th}$ second data block group are $(N*s+n)^{th}$ data blocks in each second data block subgroup in the $t^{th}$ second data block group, where s=0, 1, . . . , R−1.

Figure 8:
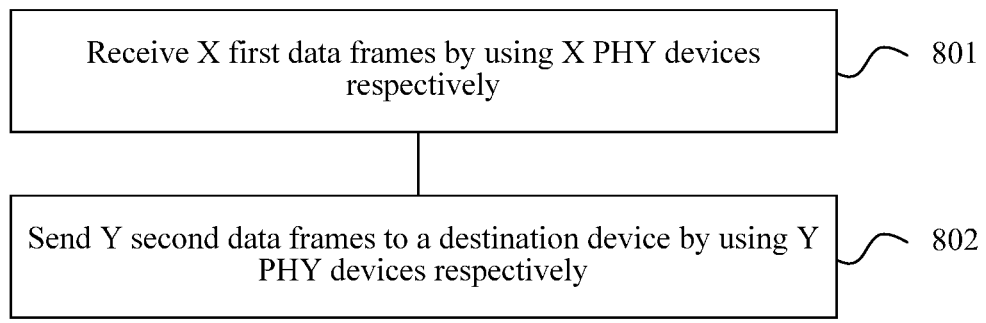
FIG. 8 is a data transmission method in flexible Ethernet FlexE according to an embodiment of the present application.

FIG. 8 is a data transmission method in flexible Ethernet FlexE according to an embodiment of the present application. The method is applied to a physical layer.

801. Receive X first data frames by using X PHY devices respectively, where an $x^{th}$ PHY device in the X PHY devices is configured to receive an $x^{th}$ first data frame in the X first data frames, a transmission rate of the $x^{th}$ first data frame is $N_x*100$ gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes $R*N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, t=1, . . . , T, $n_x$=1, . . . , $N_x$, and r=1, . . . , R.

802. Send Y second data frames to a destination device by using Y PHY devices respectively, where a $y^{th}$ PHY device in the Y PHY devices is configured to send a $y^{th}$ second data frame in the Y second data frames, a transmission rate of the $y^{th}$ second data frame is $N_y*100$ Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes $R*N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes $N_y$ continuous overhead blocks, a FlexE overhead block multiframe to which an $n_y^{th}$ overhead block in the $t^{th}$ second overhead block group belongs carries a FlexE client indication field, the FlexE client indication field carried in the FlexE overhead block multiframe to which the $n_y^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where y=1, . . . , Y, Y and $N_y$ are positive integers greater than or equal to 1, Y and $N_y$ are not equal to 1 at a same time, and $n_y$=1, . . . , $N_y$.

In the method shown in FIG. 8, X data frames may be converted into Y data frames. For example, when X is greater than Y, X first data frames may be aggregated into Y second data frames. When X is less than Y, X first data frames may be extended to Y second data frames. In addition, in the method shown in FIG. 8, multiple data blocks in one of X data frames and overhead blocks corresponding to the data blocks may be further migrated to another data frame.

The method shown in FIG. 8 may be performed by a network device. The network device may be a router, a network switch, or a firewall. The network device may include an Ethernet interface. The Ethernet interface may include a physical-layer device. The physical-layer device is a circuit configured to implement a physical-layer function. The physical-layer function is defined by the Ethernet protocol. For example, the physical-layer function may include performing physical-layer coding on a data frame. The physical-layer coding may be 8b/10b coding or 64b/66b coding. For example, the physical-layer device may be a chip. The chip may be implemented by using an ASIC or an FPGA. The network device includes the X PHY devices and the Y PHY devices.

The destination device mentioned in the method shown in FIG. 8 may be a physical-layer device, a network device, a PHY device, or a chip.

Optionally, in some embodiments, the R data blocks in each first data block subgroup in the $t^{th}$ first data block group are an $[R*(n_x-1)+1]^{th}$ data block to an $(R*n_x)^{th}$ data block in each first data block subgroup in the $t^{th}$ first data block group; or the R data blocks in each first data block subgroup in the $t^{th}$ first data block group are $(N_x*s+n_x)^{th}$ data blocks in each first data block subgroup in the $t^{th}$ first data block group, where s=0, 1, . . . , R−1.

Optionally, in some embodiments, the R data blocks in each second data block subgroup in the $t^{th}$ second data block group are an $[R*(n_y-1)+1]^{th}$ data block to an $(R*n_y)^{th}$ data block in each second data block subgroup in the $t^{th}$ second data block group; or the R data blocks in each second data block subgroup in the $t^{th}$ second data block group are $(N_y*s+n_y)^{th}$ data blocks in each second data block subgroup in the $t^{th}$ second data block group, where s=0, 1, . . . , R−1.

64/66-bit coding may be used for the data blocks in the data frames in the methods shown in FIG. 6 to FIG. 8. 64/66-bit coding may also be used for the overhead blocks in the methods shown in FIG. 6 to FIG. 8.

For specific formats of the first data frame and the second data frame, refer to the method shown in FIG. 2 and the data frame formats shown in FIG. 3 to FIG. 5. Details are not described again herein.

Figure 9:
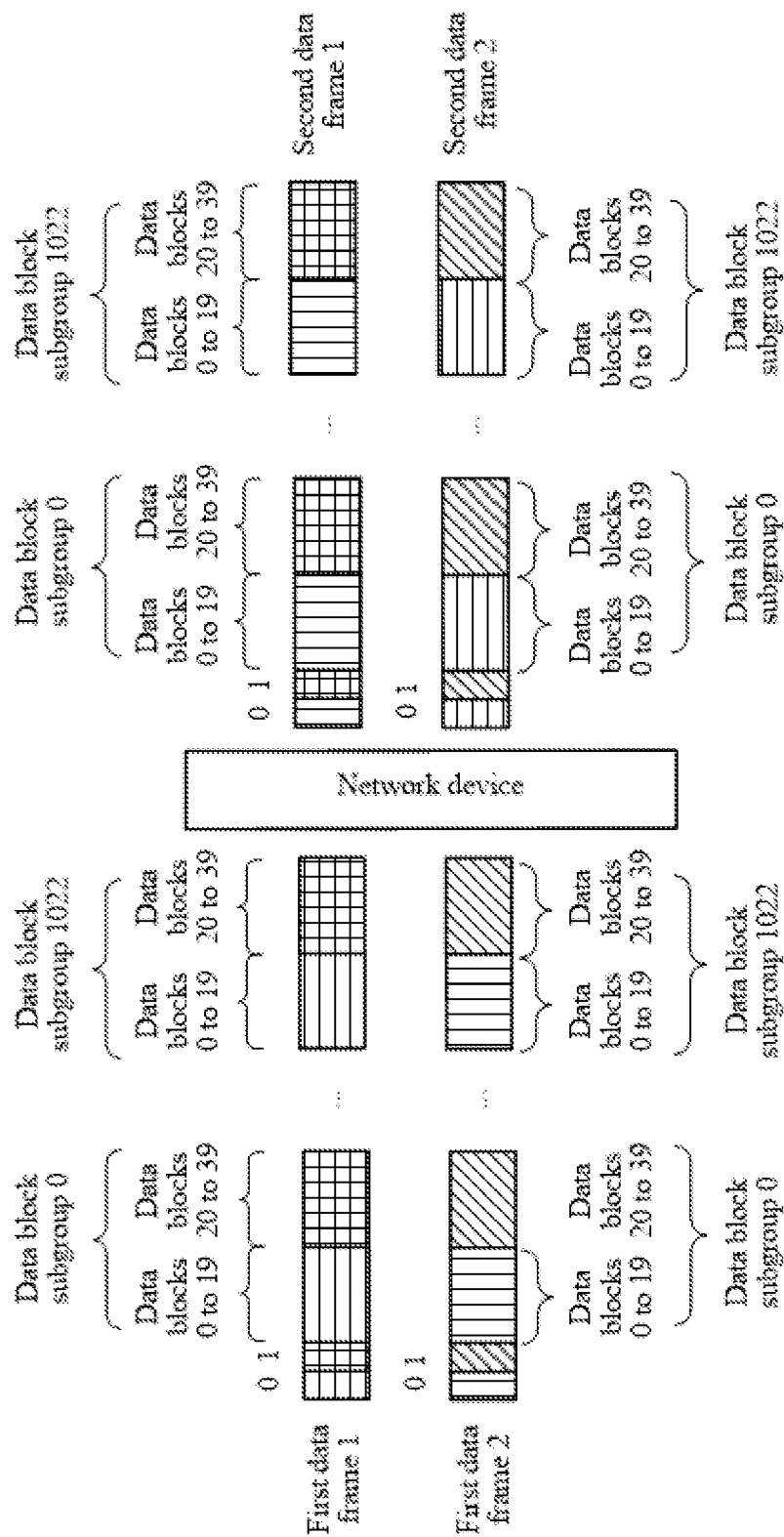
FIG. 9 is a schematic diagram of converting two first data frames into two second data frames according to an embodiment of the present application.

FIG. 9 is a schematic diagram of converting two first data frames into two second data frames according to an embodiment of the present application. Each of the two first data frames shown in FIG. 9 is received by a PHY device, and a transmission rate of each of the first data frames is 200 Gbit/s. Each of the two second data frames is sent by a PHY device, and a transmission rate of each of the second data frames is 200 Gbit/s. A value of R in the first data frame shown in FIG. 9 is 20, a value of N in the second data frame is 2, and values of n are 1 and 2.

In the first data frame and the second data frame shown in FIG. 9, a FlexE overhead block multiframe to which an $n^{th}$ overhead block in each overhead block group belongs includes a first field, and the first field is used to indicate a FlexE client to which a $[20*(n-1)+1]^{th}$ data block to a $(20*n)^{th}$ data block in each data block subgroup in a $t^{th}$ data block group belong, where n=1, 2. For ease of description, hereinafter the $n^{th}$ overhead block corresponds to the $[20*(n-1)+1]^{th}$ data block to the $(20*n)^{th}$ data block. As can be seen, a first overhead block (namely, an overhead block numbered 0) in each first data frame in the two first data frames corresponds to first to twentieth data blocks (namely, data blocks numbered 0 to 19) in each data block subgroup, and a second overhead block (namely, an overhead block numbered 1) in the first data frame corresponds to twenty-first to fortieth data blocks (namely, data blocks numbered 20 to 39) in each data block subgroup. Similarly, a first overhead block (namely, an overhead block numbered 0) in each second data frame in the two second data frames corresponds to first to twentieth data blocks (namely, data blocks numbered 0 to 19) in each data block subgroup, and a second overhead block (namely, an overhead block numbered 1) in the second data frame corresponds to twenty-first to fortieth data blocks (namely, data blocks numbered 20 to 39) in each data block subgroup.

According to the method shown in FIG. 5, an overhead block numbered 0 and data blocks corresponding the overhead block numbered 0 in a first data frame 1 may be migrated to positions in which an overhead block numbered 0 and corresponding data blocks in a second data frame 2 are located, and an overhead block numbered 0 and corresponding data blocks in a first data frame 2 may be migrated to positions in which an overhead block numbered 0 and corresponding data blocks in a second data frame 1 are located. Positions of overhead blocks numbered 1 and corresponding data blocks in the first data frame 1 and the first data frame 2 remain unchanged.

It can be seen that, when an $n^{th}$ overhead block corresponds to an $[R*(n-1)+1]^{th}$ data block to an $(R*n)^{th}$ data block, overhead blocks and corresponding data blocks in a first data frame may be conveniently migrated to a second data frame.

Figure 10:
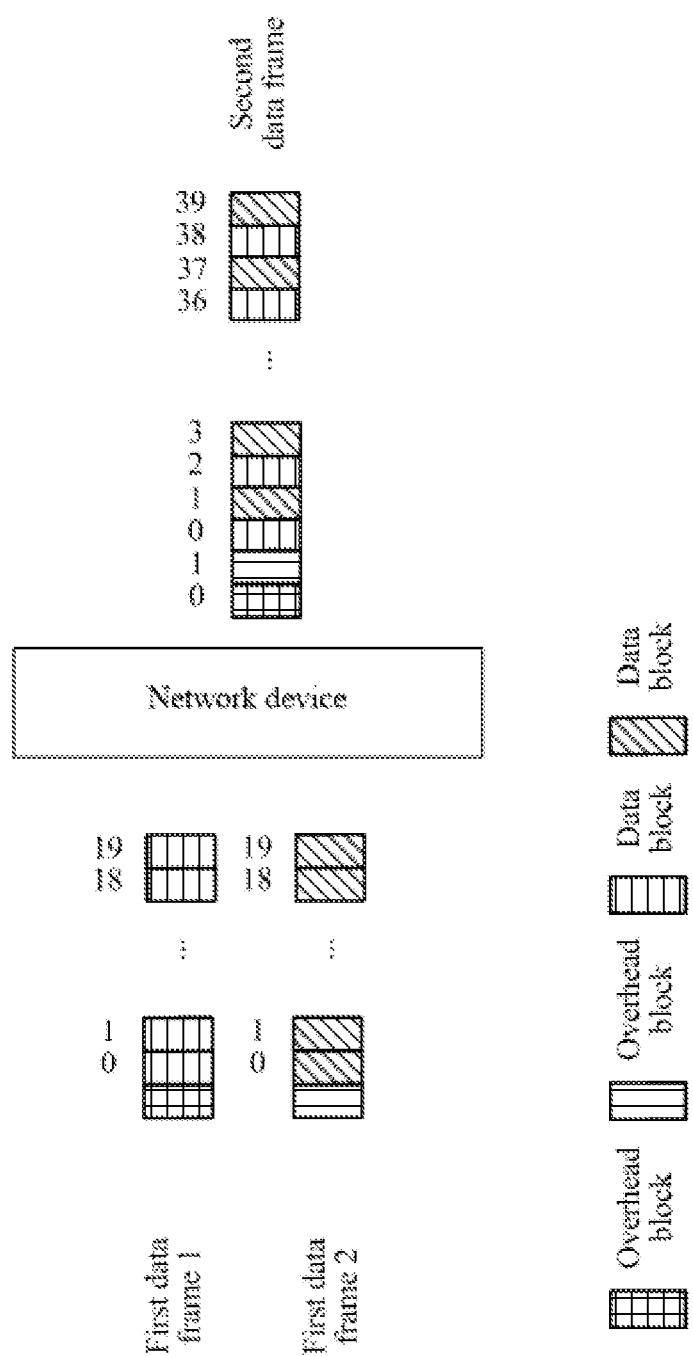
FIG. 10 is a schematic diagram of converting two first data frames into one second data frame according to an embodiment of the present application.

FIG. 10 is a schematic diagram of converting two first data frames into one second data frame according to an embodiment of the present application. Each of the two first data frames shown in FIG. 10 is received by a PHY device, and a transmission rate thereof is 100 Gbit/s. The second data frame is sent by a PHY device, and a transmission rate thereof is 200 Gbit/s.

As shown in FIG. 10, each overhead block in a first data frame 1 and a first data frame 2 is adjacent to 20 data blocks, and is located before the 20 data blocks. In addition, it may be understood that, the 20 data blocks occur repeatedly for 1023 times. According to the method shown in FIG. 5, the two first data frames may be aggregated into one second data frame. Specifically, in the second data frame, an overhead block numbered 0 is an overhead block in the first data frame 1, and an overhead block numbered 1 is an overhead block in the first data frame 2. In the second data frame, data blocks numbered 0, 2, . . . , 36, and 38 are data blocks in the first data frame 1, and data blocks numbered 1, 3, . . . , 37, and 39 are data blocks in the first data frame 2. It may be understood that, the 40 data blocks in the second data frame also occur repeatedly for 1023 times. It can be seen that, when an $n^{th}$ overhead block corresponds to $(N*s+n)^{th}$ data blocks, one overhead block may be fetched from each 100 Gbit/s data frame, and data blocks corresponding to the overhead block may be alternately fetched from the two data frames. In this way, two data frames whose transmission rates are 100 Gbit/s may be conveniently aggregated into one data frame whose transmission rate is 200 Gbit/s.

Figure 11:
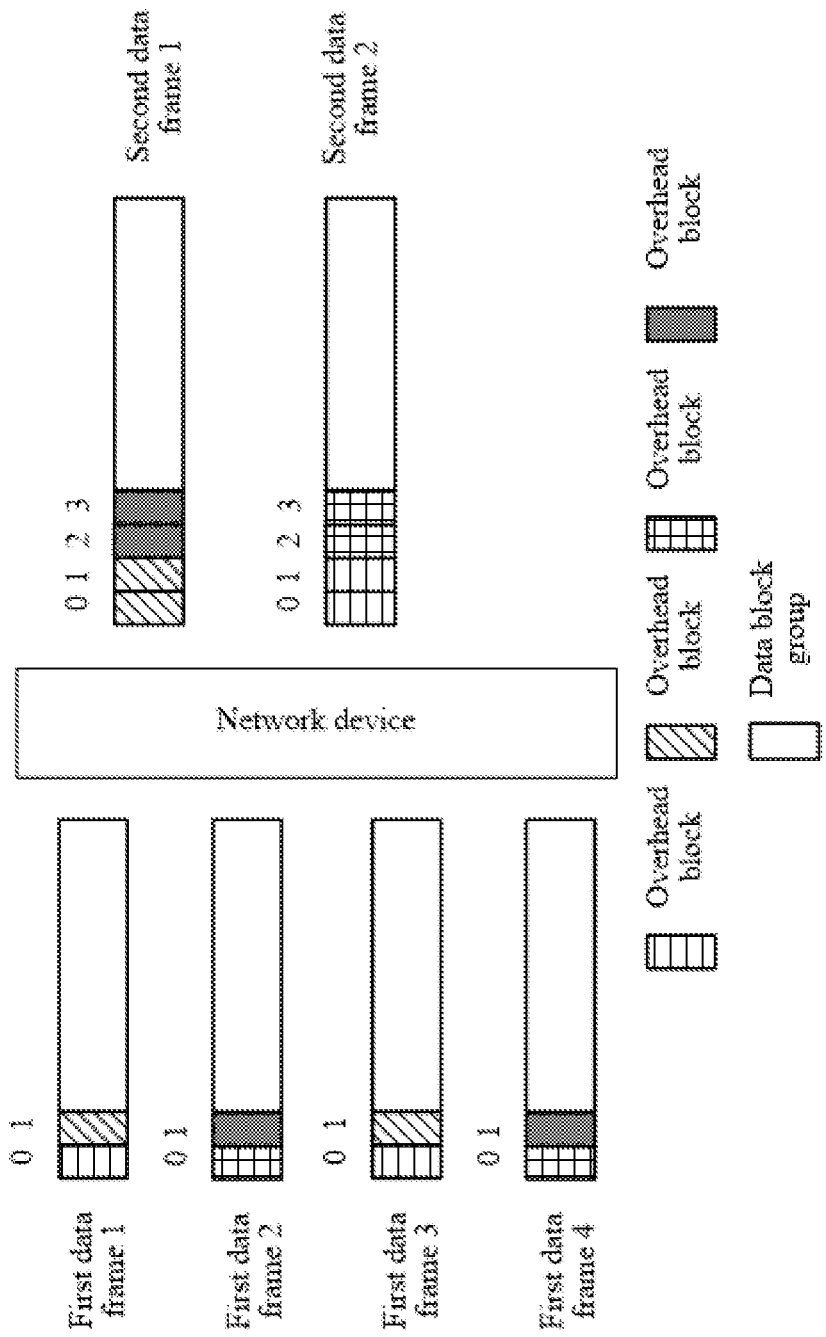
FIG. 11 is a schematic diagram of converting four first data frames into two second data frames according to an embodiment of the present application.

FIG. 11 is a schematic diagram of converting four first data frames into two second data frames according to an embodiment of the present application. Each of the four first data frames shown in FIG. 11 is received by a PHY device, and a transmission rate thereof is 200 Gbit/s. Each of the two second data frames is sent by a PHY device, and a transmission rate thereof is 400 Gbit/s.

A value of N in first data frames 1 to 4 shown in FIG. 11 is 2, and a value of N in a second data frame 1 and a second data frame 2 is 4. Assuming that a value of R in the embodiment shown in FIG. 11 is 20, a correspondence between a data block in a data block group and an overhead block that are in a first data frame and a second data frame shown in FIG. 11 may be that one overhead block corresponds to 20 continuous data blocks as shown in FIG. 9, or may be that one overhead block corresponds to 20 discrete data blocks as shown in FIG. 10.

It can be seen that, as shown in FIG. 11, first overhead blocks (namely, overhead blocks numbered 0) in the first data frame 1 and the first data frame 3 are migrated to the second data frame 2. First overhead blocks (namely, overhead blocks numbered 0) in the first data frame 2 and the first data frame 4 are migrated to the second data frame 2. Second overhead blocks (namely, overhead blocks numbered 1) in the first data frame 1 and the first data frame 3 are migrated to the second data frame 1. Second overhead blocks (namely, overhead blocks numbered 1) in the first data frame 2 and the first data frame 4 are also migrated to the second data frame 1. Because positions of overhead blocks change, positions of data blocks corresponding to the overhead blocks also change. Specifically, data blocks corresponding to the first overhead blocks in the first data frame 1 and the first data frame 3 are also migrated to the second data frame 2. Data blocks corresponding to the first overhead blocks in the first data frame 2 and the first data frame 4 are also migrated to the second data frame 2. Data blocks corresponding to the second overhead blocks in the first data frame 1 and the first data frame 3 are also migrated to the second data frame 1. Data blocks corresponding to the second overhead blocks in the first data frame 2 and the first data frame 4 are also migrated to the second data frame 1.

Data blocks from a FlexE client 1 may be separately carried in the first data frame 1 and the first data frame 3. Specifically, one or more data blocks corresponding to the first overhead block in the first data frame 1 may be data blocks from the FlexE client 1, and one or more data blocks corresponding to the first overhead block in the first data frame 3 may be data blocks from the FlexE client 1. In this way, according to the embodiment shown in FIG. 11, data blocks that are from a same FlexE client and received by different PHY devices may be aggregated and sent by one PHY device.

It may be understood that, the data frame shown in FIG. 9 to FIG. 11 is merely a part of a data frame, and not a complete data frame.

Figure 12:
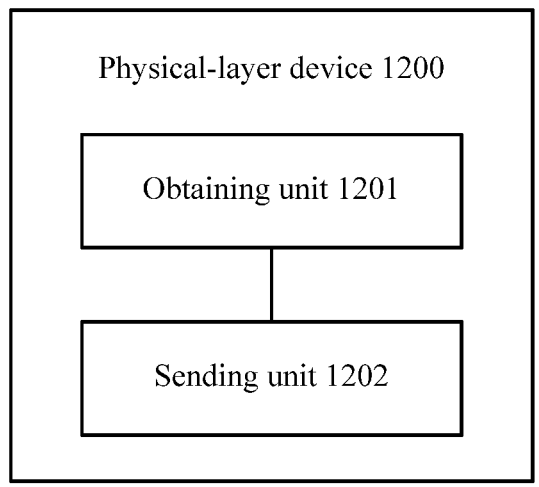
FIG. 12 is a structural block diagram of a physical-layer device according to an embodiment of the present application.

FIG. 12 is a structural block diagram of a physical-layer device according to an embodiment of the present application. As shown in FIG. 12, the physical-layer device 1200 includes an obtaining unit 1201 and a sending unit 1202. The physical-layer device 1200 shown in FIG. 12 is the first physical-layer device in the method shown in FIG. 2.

The obtaining unit 1201 is configured to obtain multiple data blocks, where the multiple data blocks are sent by L FlexE clients, and L is a positive integer greater than or equal to 1.

The sending unit 1202 is configured to send a data frame including the multiple data blocks to a second physical-layer device, where a transmission rate of the data frame is N*100 gigabits per second Gbit/s, the data frame includes T data block groups, each of the T data block groups includes M continuous data block subgroups, each of the M continuous data block subgroups includes R*N continuous data blocks, the data frame further includes T overhead block groups, a $t^{th}$ overhead block group in the T overhead block groups is sent before a $t^{th}$ data block group in the T data block groups, the $t^{th}$ overhead block group and the $t^{th}$ data block group are continuous in the data frame, the $t^{th}$ overhead block group includes N continuous overhead blocks, a FlexE overhead block multiframe to which an $n^{th}$ overhead block in the $t^{th}$ overhead block group belongs carries a FlexE client indication field, the FlexE client indication field carried in the FlexE overhead block multiframe to which the $n^{th}$ overhead block in the $t^{th}$ overhead block group belongs is used to indicate a FlexE client that sends an $r^{th}$ data block in R data blocks in each data block subgroup in the $t^{th}$ data block group or used to indicate that an $r^{th}$ data block in R data blocks in each data block subgroup in the $t^{th}$ data block group is vacant, the FlexE client that sends the $r^{th}$ data block in the R data blocks in each data block subgroup in the $t^{th}$ data block group is one of the L FlexE clients, the $r^{th}$ data block in the R data blocks in each data block subgroup in the $t^{th}$ data block group is indicated only by the FlexE client indication field carried in the FlexE overhead block multiframe to which the overhead block belongs, and a quantity of bits included in each data block in the data frame is equal to a quantity of bits included in each overhead block in the data frame, where R, M, T, and N are positive integers greater than or equal to 2, t=1, ..., T, n=1, ..., N, and r=1, ..., R.

For operations and functions of the obtaining unit 1201 and the sending unit 1202 of the physical-layer device shown in FIG. 12, refer to the method in FIG. 2. Details are not described again herein for avoiding repetition. For a data frame structure shown in FIG. 12, also refer to the method in FIG. 2. Details are not described again herein for avoiding repetition. It may be understood that, the obtaining unit 1201 may be implemented by a transceiver circuit, and the sending unit 1202 may be implemented by a PHY device.

Figure 13:
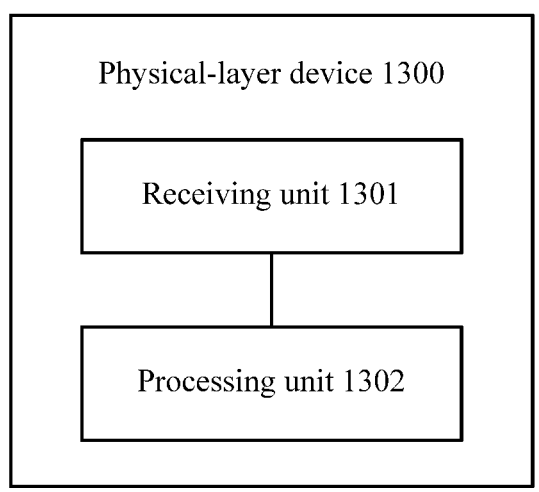
FIG. 13 is a structural block diagram of a physical-layer device according to an embodiment of the present application.

FIG. 13 is a structural block diagram of a physical-layer device according to an embodiment of the present application. As shown in FIG. 13, the physical-layer device 1300 includes a receiving unit 1301 and a processing unit 1302. The physical-layer device 1300 shown in FIG. 13 may be the second physical-layer device in the method shown in FIG. 2.

The receiving unit 1301 is configured to receive a data frame sent by a first physical-layer device, where the data frame carries multiple data blocks sent by L FlexE clients, a transmission rate of the data frame is N*100 gigabits per second Gbit/s, the data frame includes T data block groups, each of the T data block groups includes M continuous data block subgroups, each of the M data block subgroups includes R*N continuous data blocks, the data frame further includes T overhead block groups, a $t^{th}$ overhead block group in the T overhead block groups is received before a $t^{th}$ data block group in the T data block groups, the $t^{th}$ overhead block group and the $t^{th}$ data block group are continuous in the data frame, the $t^{th}$ overhead block group includes N continuous overhead blocks, a FlexE overhead block multiframe to which an $n^{th}$ overhead block in the $t^{th}$ overhead block group belongs carries a FlexE client indication field, the FlexE client indication field carried in the FlexE overhead block multiframe to which the $n^{th}$ overhead block in the $t^{th}$ overhead block group belongs is used to indicate a FlexE client that sends an $r^{th}$ data block in R data blocks in each data block subgroup in the $t^{th}$ data block group or used to indicate that an $r^{th}$ data block in R data blocks in each data block subgroup in the $t^{th}$ data block group is vacant, the FlexE client that sends the $r^{th}$ data block in the R data blocks in each data block subgroup in the $t^{th}$ data block group is one of the L FlexE clients, the $r^{th}$ data block in the R data blocks in each data block subgroup in the $t^{th}$ data block group is indicated only by the FlexE client indication field carried in the FlexE overhead block multiframe to which the overhead block belongs, and a quantity of bits included in each data block in the data frame is equal to a quantity of bits included in each overhead block in the data frame, where L is a positive integer greater than or equal to 1, R, M, T, and N are positive integers greater than or equal to 2, t=1, ..., T, n=1, ..., N, and r=1, ..., R.

The processing unit 1302 is configured to determine, according to the T overhead block groups, a FlexE client that sends each of the multiple data blocks.

For operations and functions of the receiving unit 1301 and the processing unit 1302 of the physical-layer device shown in FIG. 13, refer to the method in FIG. 2. Details are not described again herein for avoiding repetition. For a data frame structure shown in FIG. 13, also refer to the method in FIG. 2. Details are not described again herein for avoiding repetition. It may be understood that, the receiving unit 1301 may be implemented by a PHY device, and the processing unit 1302 may be implemented by a processor.

Figure 14:
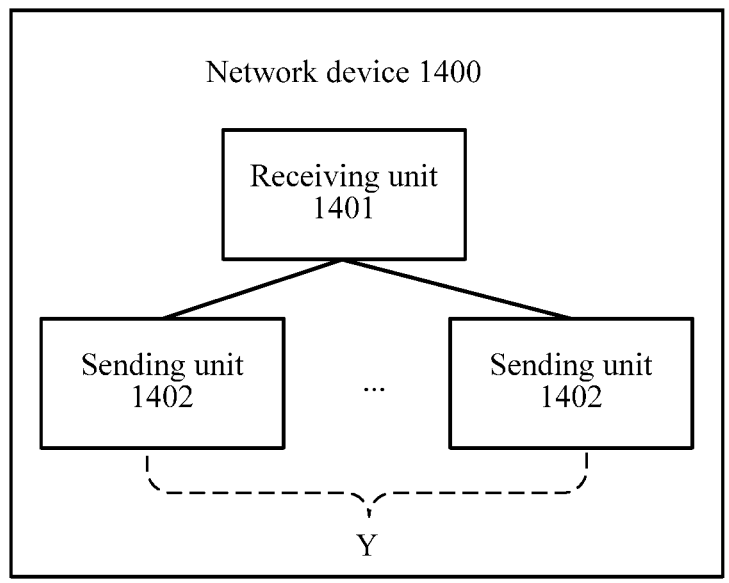
FIG. 14 is a structural block diagram of a network device according to an embodiment of the present application.

FIG. 14 is a structural block diagram of a network device according to an embodiment of the present application. As shown in FIG. 14, the network device 1400 includes a receiving unit 1401 and Y sending units 1402.

The receiving unit 1401 is configured to receive a first data frame, where a transmission rate of the first data frame is N*100 gigabits per second Gbit/s, the first data frame carries multiple data blocks from L FlexE clients, the first data frame includes T first data block groups, each of the T first data block groups includes M continuous first data block subgroups, each of the M continuous first data block subgroups includes R*N continuous data blocks, the first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the first data frame, the $t^{th}$ first overhead block group includes N continuous overhead blocks, a FlexE overhead block multiframe to which an $n^{th}$ overhead block in the $t^{th}$ first overhead block group belongs carries a FlexE client indication field, the FlexE client indication field carried in the FlexE overhead block multiframe to which the $n^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the first data frame is equal to a quantity of bits included in each overhead block in the first data frame, where L is a positive integer greater than or equal to 1, R, T, M, and N are positive integers greater than or equal to 2, $t=1, \ldots, T, n=1, \ldots, N$, and $r=1, \ldots, R$.

The Y sending units 1402 are configured to send Y second data frames to a destination device, where a $y^{th}$ sending unit in the Y sending units is configured to send a $y^{th}$ second data frame in the Y second data frames, a transmission rate of the $y^{th}$ second data frame is $N_y$*100 Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes $R*N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the $y^{th}$ second data frame, the $t^{th}$ second overhead block group includes $N_y$ overhead blocks, a FlexE overhead block multiframe to which an $n_y^{th}$ overhead block in the $t^{th}$ second overhead block group belongs carries a FlexE client indication field, the FlexE client indication field carried in the FlexE overhead block multiframe to which the $n_y^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where $y=1, \ldots, Y$, Y is a positive integer greater than or equal to 2, $N_y$ is a positive integer greater than or equal to 1, E is a positive integer greater than or equal to 1 but less than or equal to L, and $n_y=1, \ldots, N_y$.

For operations and functions of the receiving unit 1401 and the sending units 1402 of the network device shown in FIG. 14, refer to the method in FIG. 6. Details are not described again herein for avoiding repetition. For a data frame structure shown in FIG. 14, also refer to the methods in FIG. 2 and FIG. 6. Details are not described again herein for avoiding repetition. It may be understood that, the receiving unit 1401 may be implemented by a PHY device, and the sending units 1402 may be implemented by PHY devices.

Figure 15:
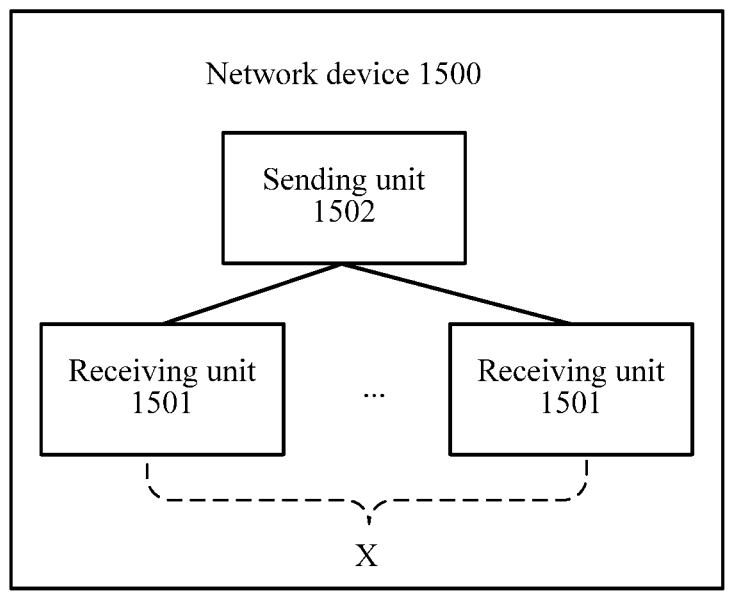
FIG. 15 is a structural block diagram of a network device according to an embodiment of the present application.

FIG. 15 is a structural block diagram of a network device according to an embodiment of the present application. As shown in FIG. 15, the network device 1500 includes X receiving units 1501 and a sending unit 1502.

The X receiving units 1501 are configured to receive X first data frames, where an $x^{th}$ receiving unit in the X receiving units is configured to receive an $x^{th}$ first data frame in the X first data frames, a transmission rate of the $x^{th}$ first data frame is $N_x$*100 gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes $R*N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, $t=1, \ldots, T$, $n_x=1, \ldots, N_x$, and $r=1, \ldots, R$.

The sending unit 1502 is configured to send a second data frame to a destination device, where a transmission rate of the second data frame is N*100 Gbit/s, the second data frame carries multiple data blocks from E FlexE clients in the L FlexE clients, the second data frame includes T second data block groups, each of the T second data block groups includes M continuous second data block subgroups, each of the M continuous second data block subgroups includes R*N continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes N continuous overhead blocks, a FlexE overhead block multiframe to which an $n^{th}$ overhead block in the $t^{th}$ second overhead block group belongs carries a FlexE client indication field, the FlexE client indication field carried in the FlexE overhead block multiframe to which the $n^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the second data frame is equal to a quantity of bits included in each overhead block in the second data frame, where N is a positive integer greater than or equal to 2, and n=1, . . . , N.

For operations and functions of the receiving units 1501 and the sending unit 1502 of the network device shown in FIG. 15, refer to the method in FIG. 7. Details are not described again herein for avoiding repetition. For a data frame structure shown in FIG. 15, also refer to the methods in FIG. 2 and FIG. 7. Details are not described again herein for avoiding repetition. It may be understood that, the receiving units 1501 may be implemented by PHY devices, and the sending unit 1502 may be implemented by a PHY device.

Figure 16:
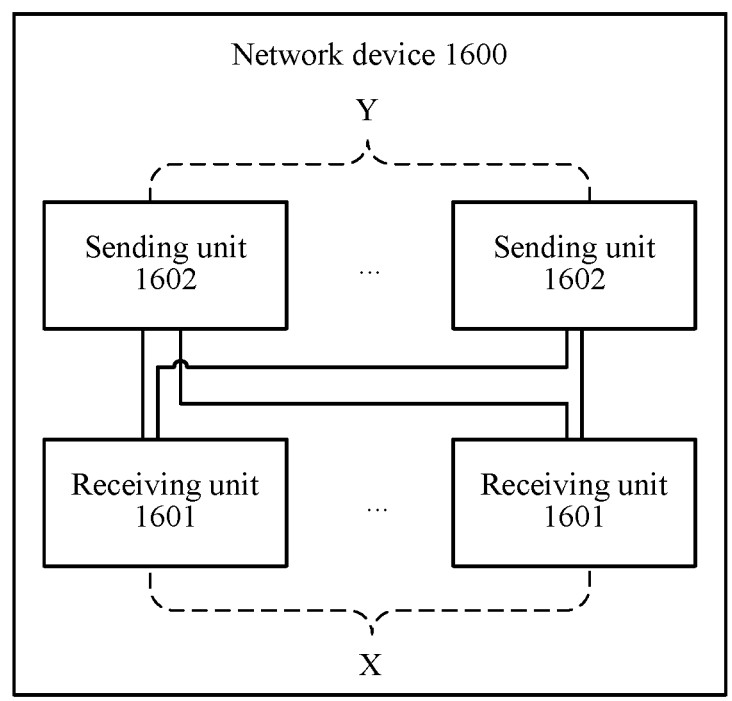
FIG. 16 is a structural block diagram of a network device according to an embodiment of the present application.

FIG. 16 is a structural block diagram of a network device according to an embodiment of the present application. As shown in FIG. 16, the network device 1600 includes X receiving units 1601 and Y sending units 1602.

The X receiving units 1601 are configured to receive X first data frames, where an $x^{th}$ receiving unit in the X receiving units is configured to receive an $x^{th}$ first data frame in the X first data frames, a transmission rate of the $x^{th}$ first data frame is $N_x$*100 gigabits per second Gbit/s, the X first data frames carry multiple data blocks from L FlexE clients, the $x^{th}$ first data frame in the X first data frames includes T first data block groups, each of the T first data block groups includes M continuous first data block subgroups, each of the M continuous first data block subgroups includes R*$N_x$ continuous data blocks, the $x^{th}$ first data frame further includes T first overhead block groups, a $t^{th}$ first overhead block group in the T first overhead block groups is received before a $t^{th}$ first data block group in the T first data block groups, the $t^{th}$ first overhead block group and the $t^{th}$ first data block group are continuous in the $x^{th}$ first data frame, the $t^{th}$ first overhead block group includes $N_x$ continuous overhead blocks, a FlexE overhead block multiframe to which an $n_x^{th}$ overhead block in the $t^{th}$ first overhead block group belongs carries a FlexE client indication field, the FlexE client indication field carried in the FlexE overhead block multiframe to which the $n_x^{th}$ overhead block in the $t^{th}$ first overhead block group belongs is used to indicate a FlexE client that sends an $r^{th}$ data block in R data blocks in each first data block subgroup in the $t^{th}$ first data block group or used to indicate that an $r^{th}$ data block in R data blocks in each first data block subgroup in the $t^{th}$ first data block group is vacant, the FlexE client that sends the $r^{th}$ data block in the R data blocks in each first data block subgroup in the $t^{th}$ first data block group is one of the L FlexE clients, the $r^{th}$ data block in the R data blocks in each first data block subgroup in the $t^{th}$ first data block group is indicated only by the FlexE client indication field carried in the FlexE overhead block multiframe to which the overhead block belongs, and a quantity of bits included in each data block in the $x^{th}$ first data frame is equal to a quantity of bits included in each overhead block in the $x^{th}$ first data frame, where $N_x$ and L are positive integers greater than or equal to 1, R, T, and M are positive integers greater than or equal to 2, t=1, . . . , T, $n_x$=1, . . . , $N_x$, and r=1, . . . , R.

The Y sending units 1602 are configured to send Y second data frames to a destination device, where a $y^{th}$ sending unit in the Y sending units is configured to send a $y^{th}$ second data frame in the Y second data frames, a transmission rate of the $y^{th}$ second data frame is $N_y$*100 Gbit/s, the Y second data frames carry multiple data blocks from E FlexE clients in the L FlexE clients, the $y^{th}$ second data frame in the Y second data frames includes T second data block groups, each of the T second data block groups includes M continuous second data block subgroups, each of the M continuous second data block subgroups includes R*$N_y$ continuous data blocks, the $y^{th}$ second data frame further includes T second overhead block groups, a $t^{th}$ second overhead block group in the T second overhead block groups is sent before a $t^{th}$ second data block group in the T second data block groups, the $t^{th}$ second overhead block group and the $t^{th}$ second data block group are continuous in the data frame, the $t^{th}$ second overhead block group includes $N_y$ continuous overhead blocks, a FlexE overhead block multiframe to which an $n_y^{th}$ overhead block in the $t^{th}$ second overhead block group belongs carries a FlexE client indication field, the FlexE client indication field carried in the FlexE overhead block multiframe to which the $n_y^{th}$ overhead block in the $t^{th}$ second overhead block group belongs is used to indicate a FlexE client that sends an $r^{th}$ data block in R data blocks in each second data block subgroup in the $t^{th}$ second data block group or used to indicate that an $r^{th}$ data block in R data blocks in each second data block subgroup in the $t^{th}$ second data block group is vacant, the FlexE client that sends the $r^{th}$ data block in the R data blocks in each second data block subgroup in the $t^{th}$ second data block group is one of the E FlexE clients, the $r^{th}$ data block in the R data blocks in each second data block subgroup in the $t^{th}$ second data block group is indicated only by the FlexE client indication field carried in the FlexE overhead block multiframe to which the overhead block belongs, and a quantity of bits included in each data block in the $y^{th}$ second data frame is equal to a quantity of bits included in each overhead block in the $y^{th}$ second data frame, where y=1, . . . , Y, Y and $N_y$ are positive integers greater than or equal to 1, Y and $N_y$ are not equal to 1 at a same time, and $n_y$=1, . . . , $N_y$.

For operations and functions of the receiving units 1601 and the sending units 1602 of the network device shown in FIG. 16, refer to the method in FIG. 8. Details are not described again herein for avoiding repetition. For a data frame structure shown in FIG. 16, also refer to the methods in FIG. 2 and FIG. 8. Details are not described again herein for avoiding repetition. It may be understood that, the receiving units 1601 may be implemented by PHY devices, and the sending units 1602 may be implemented by PHY devices.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the disclosed embodiments may be implemented in a form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method implemented by an apparatus supporting Flexible Ethernet (FlexE), the method comprising:
    obtaining data blocks from L FlexE clients, wherein L is a positive integer;
    transmitting N overhead blocks in sequential order and at a transmission rate of N*100 gigabits per second (Gb/s), wherein N is a positive integer greater than 1; and
    transmitting (R*N) data blocks in sequential order and at the transmission rate,
    wherein R is a positive integer greater than 1, and
    wherein the R*N data blocks are the first to $(R*N)^{th}$ data blocks from the data blocks.

2. The method of claim 1, further comprising:
    transmitting $(N+1)^{th}$ $(2*N)^{th}$ overhead blocks in order and at the transmission rate; and
    transmitting $(R*N+1)^{th}$ $(2*R*N)^{th}$ data blocks in sequential order and at the transmission rate,
    wherein the 2*R*N data blocks are the $(R*N+1)^{th}$ to $(2*R*N)^{th}$ data blocks from the data blocks, and
    wherein the $(R*N+1)^{th}$ data block is transmitted following the $(2*N)^{th}$ overhead block.

3. The method of claim 1, where the $n^{th}$ overhead block comprises an $n^{th}$ FlexE client indication field, wherein the $n^{th}$ FlexE client indication field is configured to indicate that the $r^{th}$ data block is from the $l^{th}$ FlexE client, wherein n is a positive integer, wherein n≤N, wherein l≥1, and wherein l≤L.

4. The method of claim 1, where the $n^{th}$ overhead block comprises an $n^{th}$ FlexE client indication field, wherein the $n^{th}$ FlexE client indication field is configured to indicate that the $r^{th}$ data block is vacant, wherein n is a positive integer, wherein n≤N, wherein r is a positive integer, and wherein r≤R.

5. The method of claim 1, where N=2, 4, or 8, and wherein R=20.

6. A method implemented by an apparatus supporting Flexible Ethernet (FlexE), the method comprising:
    receiving a data block at a transmission rate of N*100 gigabits per second (Gb/s), wherein N is a positive integer greater than 1, wherein the data block is one of a plurality of data blocks from L FlexE clients, and wherein L is a positive integer; and
    determining, according to a rule, a FlexE client to which the data block belongs,
    wherein the rule is based on a series of data blocks received before the data block.

7. The method of claim 6, further comprising receiving an overhead block comprising a FlexE client indication field.

8. The method of claim 7, wherein the FlexE client indication field is configured to indicate that the data block is from the $l^{th}$ FlexE client, wherein l is a positive integer, and wherein l≤L.

9. The method of claim 7, wherein the FlexE client indication field is configured to indicate that the data block is vacant.

10. The method of claim 6, where N=2, 4, or 8.

11. An apparatus supporting Flexible Ethernet (FlexE) and comprising:
- a memory configured to store instructions; and
- a processor coupled to the memory and configured to execute the instructions to cause the apparatus to:
  - obtain data blocks from L FlexE clients, wherein L is a positive integer;
  - transmit N overhead blocks in sequential order and at a transmission rate of N*100 gigabits per second (Gb/s), wherein N is a positive integer greater than 1; and
  - transmit (R*N) data blocks in sequential order and at the transmission rate,
  - wherein R is a positive integer greater than 1, and
  - where the R*N data blocks are the first to $(R*N)^{th}$ data blocks from the data blocks.

12. The apparatus of claim 11, where the processor is further configured to execute the instructions to cause the apparatus to:
- transmit $(N+1)^{th}$ to $(2*N)^{th}$ overhead blocks in sequential order and at the transmission rate; and
- transmit $(R*N+1)^{th}$ to $(2*R*N)^{th}$ data blocks in sequential order and at the transmission rate,
- wherein the 2*R*N data blocks are the $(R*N+1)^{th}$ to $(2*R*N)^{th}$ data blocks from the data blocks, and
- wherein the $(R*N+1)^{th}$ data block is transmitted following the $(2*N)^{th}$ overhead block.

13. The apparatus of claim 11, where the $n^{th}$ overhead block comprises an $n^{th}$ FlexE client indication field, wherein the $n^{th}$ FlexE client indication field is configured to indicate that the $r^{th}$ data block is from the $l^{th}$ FlexE client, wherein n is a positive integer, wherein n≤N, wherein l≥1, and wherein l≤L.

14. The apparatus of claim 11, where the $n^{th}$ overhead block comprises an $n^{th}$ FlexE client indication field, wherein the $n^{th}$ FlexE client indication field is configured to indicate that the $r^{th}$ data block is vacant, wherein n is a positive integer, wherein n≤N, wherein r is a positive integer, and wherein r≤R.

15. The apparatus of claim 11, wherein N=2, 4, or 8, and wherein R=20.

16. An apparatus supporting Flexible Ethernet (FlexE) and comprising:
- a memory configured to store instructions; and
- a processor coupled to the memory and configured to execute the instructions to cause the apparatus to:
  - receive a data block at a transmission rate of N*100 gigabits per second (Gb/s), wherein N is a positive integer, wherein the data block is one of a plurality of data blocks from L FlexE clients, and wherein L is a positive integer; and
  - determine, according to a rule, a FlexE client to which the data block belongs,
  - wherein the rule is based on a series of data blocks received before the data block.

17. The apparatus of claim 16, where the processor is further configured to execute the instructions to cause the apparatus to receive an overhead block comprising a FlexE client indication field, wherein the FlexE client indication field is configured to indicate that the data block is from the $l^{th}$ FlexE client, wherein l is a positive integer, and wherein l≤L.

18. The apparatus of claim 17, wherein the FlexE client indication field is configured to indicate that the data block is from the $l^{th}$ FlexE client, wherein l is a positive integer, and wherein l≤L.

19. The apparatus of claim 17, wherein the FlexE client indication field is configured to indicate that the data block is vacant.

20. The apparatus of claim 16, where N=2, 4, or 8.

* * * * *

UNITED STATES PATENT AND TRADEMARK OFFICE
CERTIFICATE OF CORRECTION

PATENT NO. : 11,146,669 B2  
APPLICATION NO. : 16/392178  
DATED : October 12, 2021  
INVENTOR(S) : Si et al.

Page 1 of 1

It is certified that error appears in the above-identified patent and that said Letters Patent is hereby corrected as shown below:

In the Claims

Claim 2, Column 46, Line 26: "transmitting $(N+1)^{th}$ $(2*N)^{th}$ overhead" should read "transmitting $(N+1)^{th}$ to $(2*N)^{th}$ overhead"

Claim 2, Column 46, Line 27: "transmitting $(R*N+1)^{th}$ $(2*R*N)^{th}$ data" should read "transmitting $(R*N+1)^{th}$ to $(2*R*N)^{th}$ data"

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*